United States Patent
Takahashi

(10) Patent No.: US 8,237,853 B2
(45) Date of Patent: Aug. 7, 2012

(54) IMAGE SENSING APPARATUS AND CONTROL METHOD THEREFOR

(75) Inventor: Kenji Takahashi, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 633 days.

(21) Appl. No.: 11/779,475

(22) Filed: Jul. 18, 2007

(65) Prior Publication Data

US 2008/0024616 A1    Jan. 31, 2008

(30) Foreign Application Priority Data

Jul. 31, 2006    (JP) .................. 2006-208932

(51) Int. Cl.
*H04N 5/238* (2006.01)
*H04N 5/222* (2006.01)

(52) U.S. Cl. .................. 348/364; 348/333.04

(58) Field of Classification Search ............... 348/364, 348/365
See application file for complete search history.

(56) References Cited

U.S. PATENT DOCUMENTS

| | | | |
|---|---|---|---|
| 2003/0071908 A1* | 4/2003 | Sannoh et al. ............ | 348/345 |
| 2003/0164890 A1* | 9/2003 | Ejima et al. ............. | 348/333.1 |
| 2003/0184659 A1* | 10/2003 | Skow ................ | 348/223.1 |
| 2005/0219393 A1* | 10/2005 | Sugimoto .............. | 348/333.01 |
| 2007/0030375 A1* | 2/2007 | Ogasawara et al. ...... | 348/333.11 |

FOREIGN PATENT DOCUMENTS

| | | |
|---|---|---|
| JP | 10-232934 | 9/1998 |
| JP | 2000-048184 | 2/2000 |
| JP | 2002-251380 | 9/2002 |
| JP | 2003-107555 | 4/2003 |

* cited by examiner

*Primary Examiner* — Sinh Tran
*Assistant Examiner* — Jason Flohre
(74) *Attorney, Agent, or Firm* — Cowan, Liebowitz & Latman, P.C.

(57) ABSTRACT

An image sensing apparatus that carries out image sensing continuously and inputs a plurality of images, having a digital signal processing circuit that detects, at each input image, from image data thereof, an object that satisfies a preset condition, a first exposure value determination unit that calculates a first exposure value from the image data, a second exposure value determination unit that calculates a second exposure value based on the detected object, and a selection unit that selects either the first exposure value, the second exposure value, a currently set exposure value, or an exposure value calculated based on a luminance of an area referenced when calculating a currently set exposure value as an exposure value to be used for a next image sensing based on object detection results obtained by the digital signal processing circuit.

6 Claims, 24 Drawing Sheets

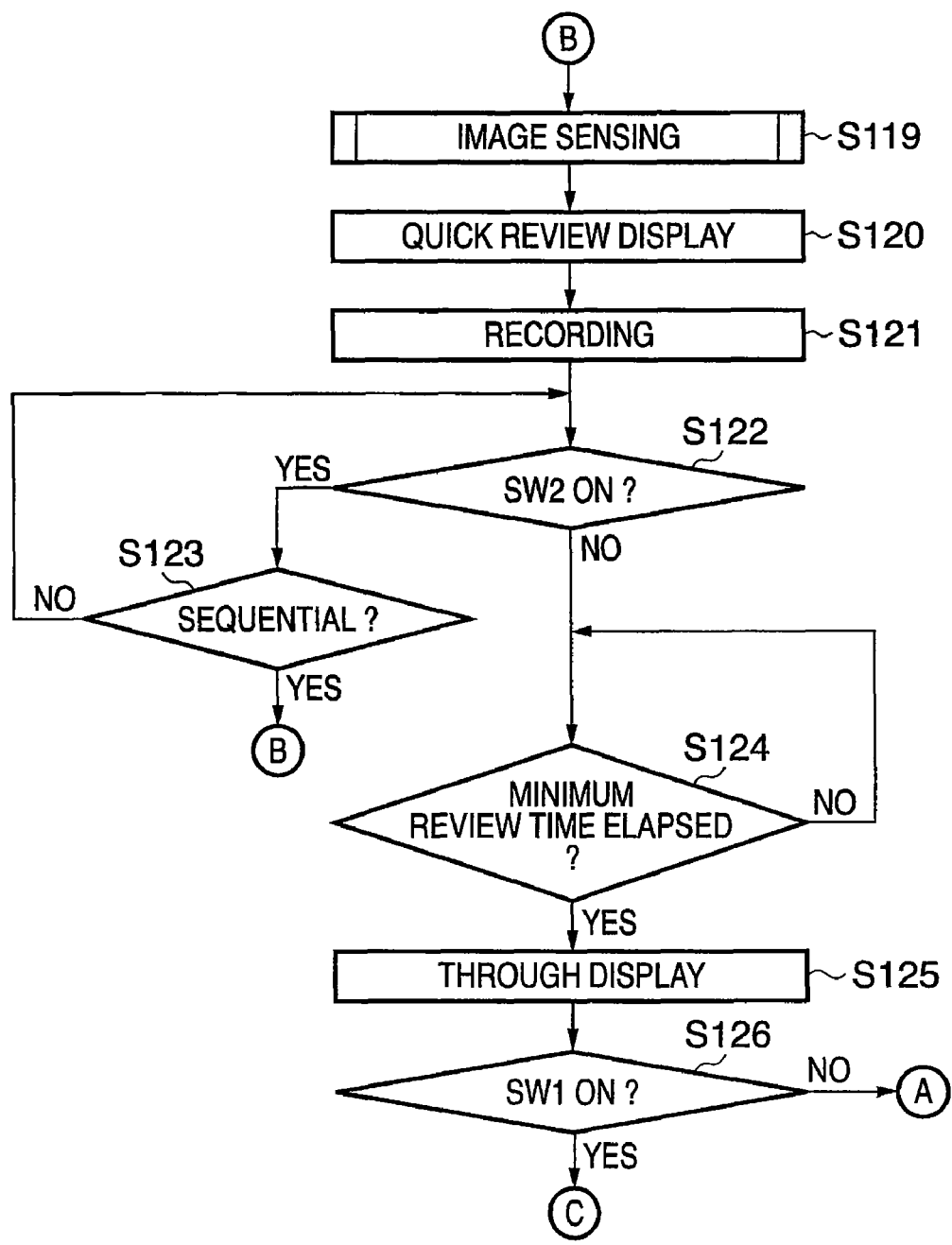

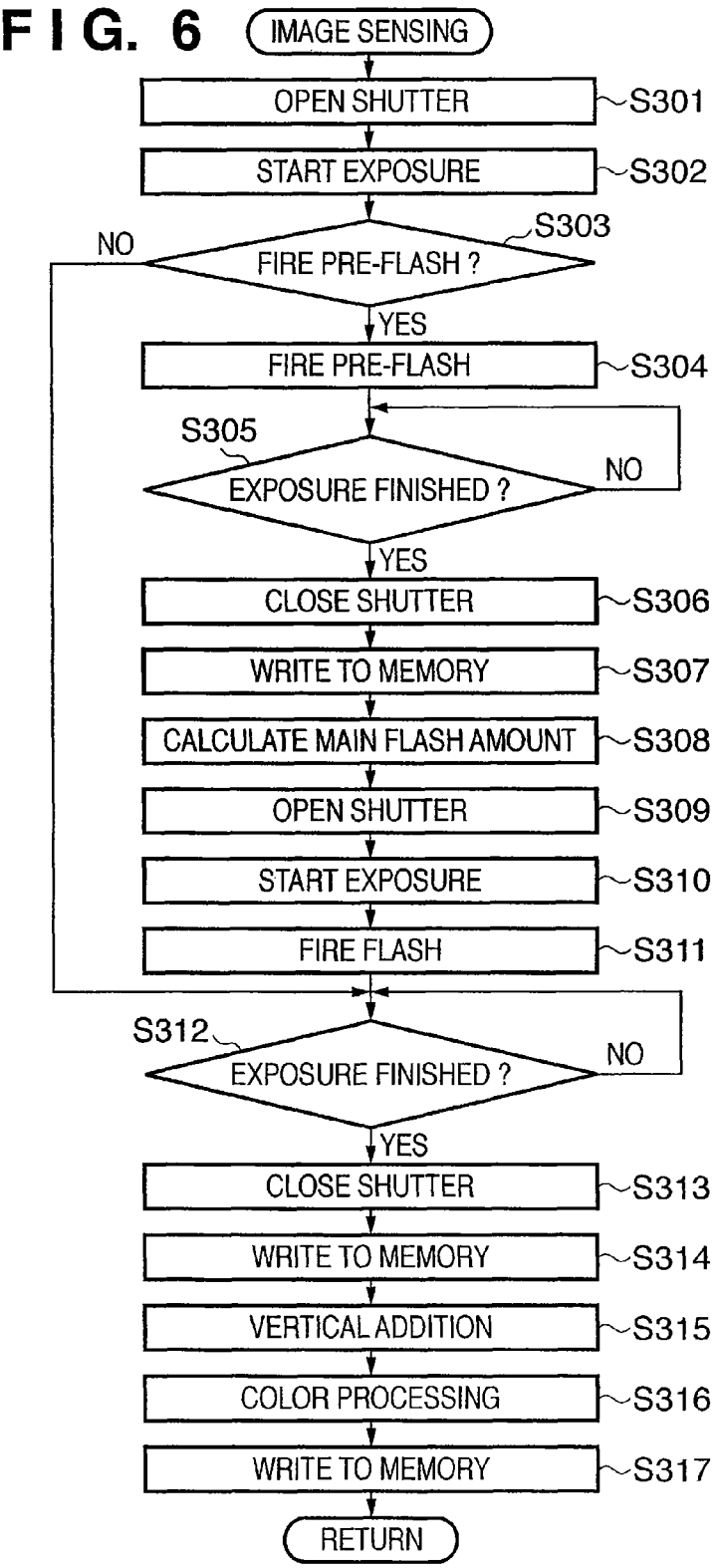

FIG. 10

| W11 | W21 | W31 |  |  |  |  |  |
|-----|-----|-----|--|--|--|--|--|
| W12 | W22 |  |  |  |  |  |  |
| W13 |  |  |  |  |  |  |  |
|  |  |  |  |  |  |  |  |
|  |  |  |  |  |  |  |  |
|  |  |  |  |  |  |  |  |
|  |  |  |  |  |  |  | W87 |
|  |  |  |  |  |  | W78 | W88 |

LUMINANCE BLOCK WEIGHT TABLE

FIG. 11

|  | FRAME IS NOT DISPLAYED | FRAME IS DISPLAYED |
|---|---|---|
| NO FACE DETECTION INFORMATION | Bv1 | Bv0 |
| FACE DETECTION INFORMATION | | Bv2 |

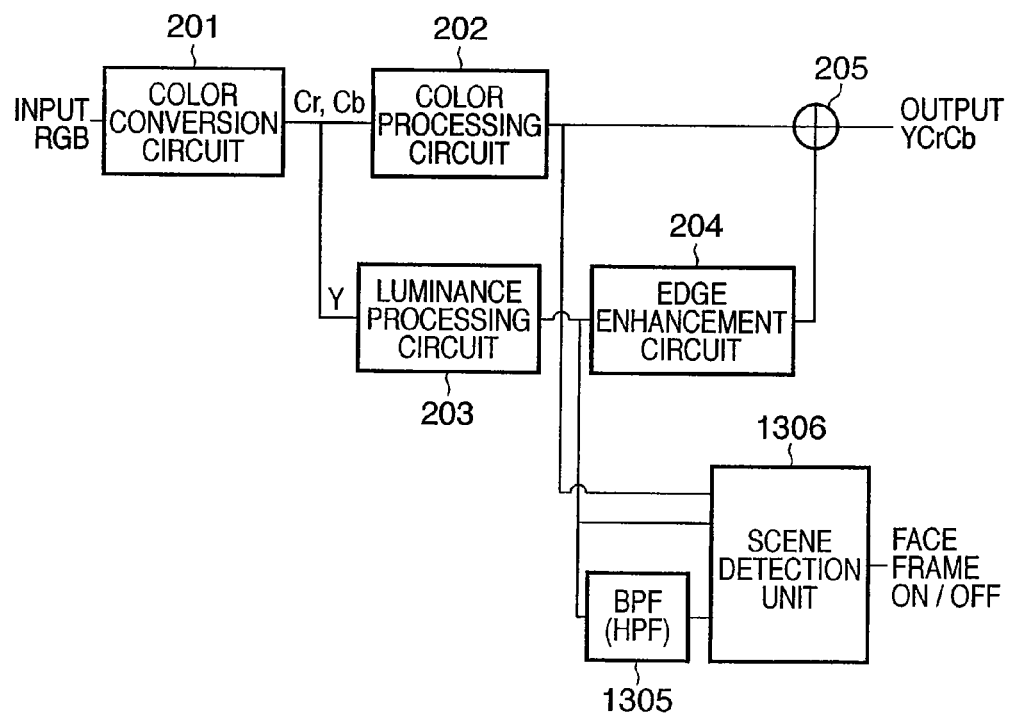
F I G. 12

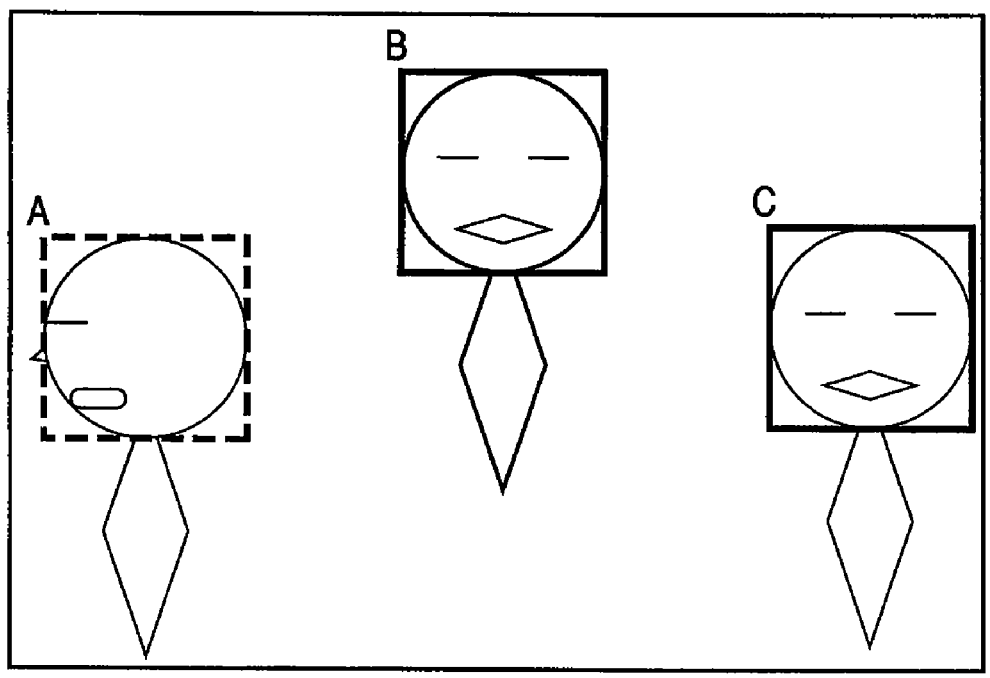
F I G. 17

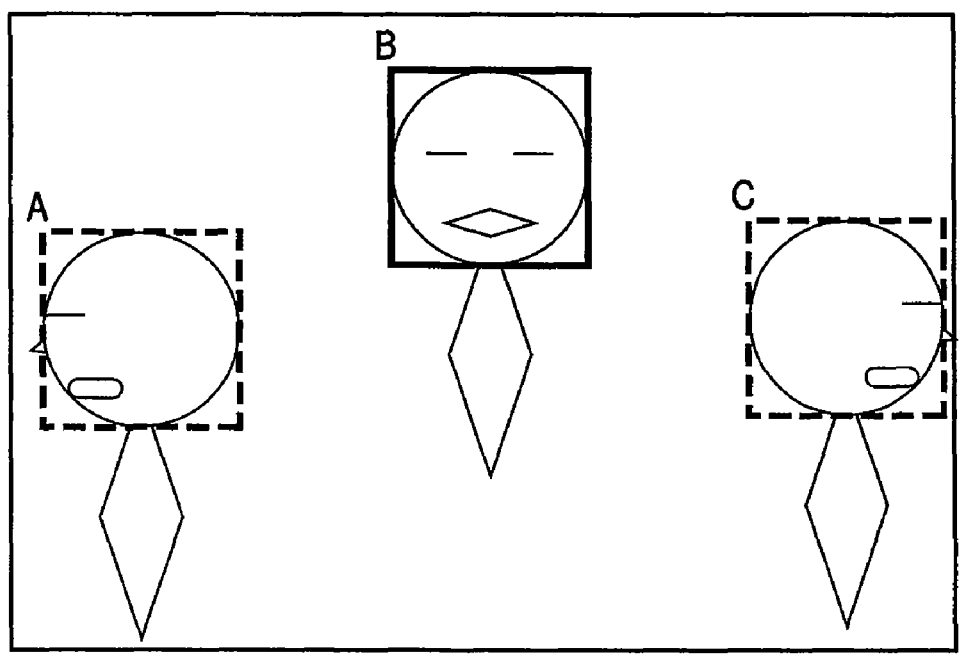
F I G. 18

F I G. 20
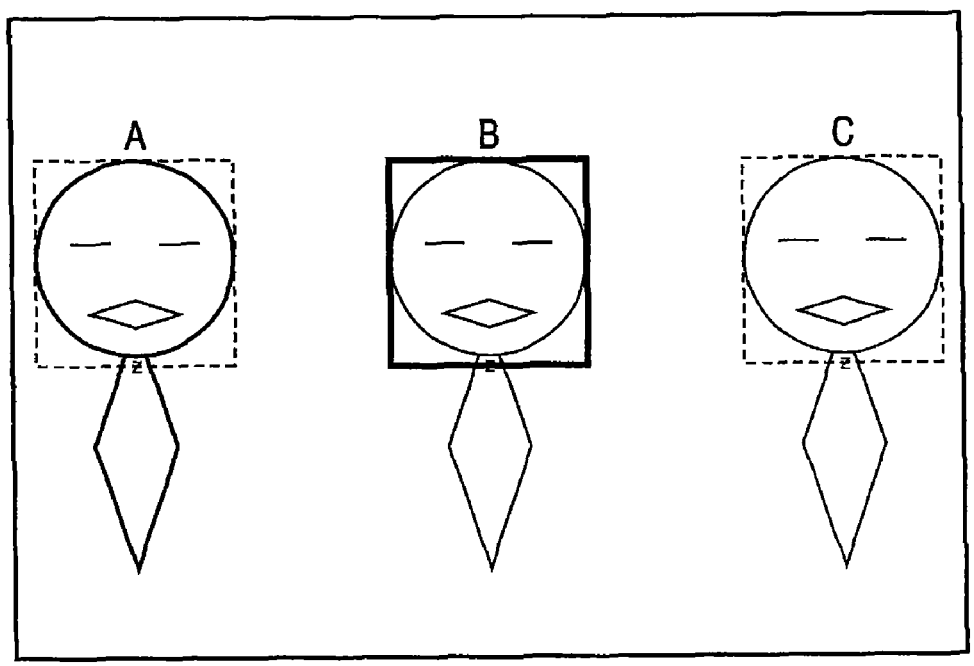

IMAGE SENSING APPARATUS AND CONTROL METHOD THEREFOR

BACKGROUND OF THE INVENTION

1. Field of the Invention

The present invention relates to an image sensing apparatus and a control method therefor, and more particularly, to an image sensing apparatus and a control method therefor that controls exposure according to a subject satisfying predetermined conditions.

2. Description of the Related Art

Conventionally, there is an image sensing apparatus equipped with an automatic exposure function that determines the exposure automatically with the entire frame being taken into account. In an image sensing apparatus of this type, depending on the scene the determined exposure might cause improper luminance of the main object. In order to obtain the proper luminance for the main object, there are apparatuses in which the user specifies the area in which the main object is present and the apparatus adjusts the exposure based on the specified area. However, such a method burdens the user.

Meanwhile, there is an apparatus having a function that repeatedly detects an object that satisfies predetermined conditions from image data. It is proposed that a camera that acquires the image data using a solid-state image sensing element composed of photoelectric converter elements automatically detects a face that is the main object by a technique such as shape analysis from the obtained image data and controls exposure so that the detected face is properly exposed (see, for example, JP-2003-107555-A). With such a camera, image sensing such that the luminance of the main object is proper no matter what the scene can be carried out.

It should be noted that, as the detection operation in a case in which the face is the main object, a method that detects a person's full face or three-quarter face based on the position of facial features such as the eyes, nose and mouth is proposed in JP-2002-251380-A.

However, with the main object detection method of JP-2002-251380-A, as shown in FIG. 15A and 15B, both eyes cannot be recognized from the images obtained when the main object blinks his or her eyes (FIG. 15A) or suddenly turns and looks away so that the face is in profile (FIG. 15B). In these instances, the main object cannot be detected, and as a result, it becomes temporarily impossible to detect the main object despite the fact that the main object is in the same place within the frame.

If, for example, the subject is a child who finds it difficult to sit still, when carrying out detection of the main object with the method of JP-2002-251380-A there is a strong possibility that the main object temporarily fails to be detected.

When conducting exposure control so as to detect the main object and get its luminance proper, what is considered proper when the main object is detected differs from what is considered proper when the main object fails to be detected. Consequently, despite sensing the same object, images of different luminances are sensed within a short interval.

SUMMARY OF THE INVENTION

The present invention has been made in consideration of the above situation, and has as its object to prevent sudden sharp changes in exposure when an object that is a target temporarily cannot be detected, in an image sensing apparatus having a function that detects a particular object from image data and adjusts the exposure to the detected object.

According to one aspect of the present invention, an image sensing apparatus configured to carry out image sensing continuously and input a plurality of images, comprises:
   a detection unit configured to detect, at each input image, from image data thereof, an object that satisfies a preset condition;
   a first exposure value determination unit configured to calculate a first exposure value from the image data;
   a second exposure value determination unit configured to calculate a second exposure value based on an object detected by the detection unit from the image data; and
   a selection unit configured to select either the first exposure value, the second exposure value, a currently set exposure value, or an exposure value calculated anew based on a luminance of an area referenced when calculating a currently set exposure value as an exposure value to be used for a next image sensing based on object detection results obtained by the detection unit.

According to another aspect of the present invention, an image sensing apparatus configured to carry out image sensing continuously and input a plurality of images, comprises
   a detection unit configured to detect, at each input image, from image data thereof, an object that satisfies a preset condition;
   a determination unit configured to determine whether or not there is a change in scene between the each input image and an image input immediately prior to the image;
   a first exposure value determination unit configured to calculate a first exposure value from the image data;
   a second exposure value determination unit configured to calculate a second exposure value based on an object detected by the detection unit from the image data; and
   a selection unit configured to select either the first exposure value, the second exposure value, a currently set exposure value, or an exposure value calculated anew based on a luminance of an area referenced when calculating a currently set exposure value as an exposure value to be used for a next image sensing based on object detection results obtained by the detection unit and on determination results concerning a change in scene obtained by the determination unit.

According to still another aspect of the present invention, an image sensing apparatus configured to carry out image sensing continuously and input a plurality of images, comprises:
   a detection unit configured to detect, at each input image, from image data thereof, one or more objects that satisfy a preset condition;
   a main object detection unit configured to detect a main object from among the objects detected by the detection unit;
   a first exposure value determination unit configured to calculate a first exposure value from the image data;
   a second exposure value determination unit configured to calculate a second exposure value based on the main object detected by the main object detection unit from the image data; and
   a selection unit configured to select either the first exposure value, the second exposure value, a currently set exposure value, or an exposure value calculated anew based on a luminance of an area referenced when calculating a currently set exposure value as an exposure value to be used for a next image sensing based on results obtained by the main object detection unit.

According to yet another aspect of the present invention, a control method for an image sensing apparatus configured to carry out image sensing continuously and input a plurality of images, the control method comprises:

a detection step of detecting, at each input image, from image data thereof, an object that satisfies a preset condition;

a first exposure value determination step of calculating a first exposure value from the image data;

a second exposure value determination step of calculating a second exposure value based on an object detected in the detection step from the image data; and a selection step of selecting either the first exposure value, the second exposure value, a currently set exposure value, or an exposure value calculated anew based on a luminance of an area referenced when calculating a currently set exposure value as an exposure value to be used for a next image sensing based on object detection results obtained in the detection step.

According to still yet another aspect of the present invention, a control method for an image sensing apparatus configured to carry out image sensing continuously and input a plurality of images, the control method comprises:

a detection step of detecting, at each input image, from image data thereof, an object that satisfies a preset condition;

a determination step of determining whether or not there is a change in scene between the each input image and an image input immediately prior to the image;

a first exposure value determination step of calculating a first exposure value from the image data;

a second exposure value determination step of calculating a second exposure value based on an object detected in the detection step from the image data; and a selection step of selecting either the first exposure value, the second exposure value, a currently set exposure value, or an exposure value calculated anew based on a luminance of an area referenced when calculating a currently set exposure value as an exposure value to be used for a next image sensing based on object detection results obtained in the detection step and on determination results concerning a change in scene obtained in the determination step.

According to yet still another aspect of the present invention, a control method for an image sensing apparatus configured to carry out image sensing continuously and input a plurality of images, the control method comprises:

a detection step of detecting, at each input image, from image data thereof, one or more objects that satisfy a preset condition;

a main object detection step of detecting a main object from among the objects detected in the detection step;

a first exposure value determination step of calculating a first exposure value from the image data;

a second exposure value determination step of calculating a second exposure value based on the main object detected in the main object detection step from the image data; and a selection step of selecting either the first exposure value, the second exposure value, a currently set exposure value, or an exposure value calculated anew based on a luminance of an area referenced when calculating a currently set exposure value as an exposure value to be used for a next image sensing based on results obtained in the main object detection step.

Further features of the present invention will become apparent from the following description of exemplary embodiments (with reference to the attached drawings).

BRIEF DESCRIPTION OF THE DRAWINGS

FIGS. 3A and 3B are flow charts illustrating a main processing routine according to the first embodiment of the present invention;

FIG. 6 is a flow chart illustrating an image sensing processing routine according to the first embodiment of the present invention;

FIG. 10 is a diagram illustrating a weight table used when calculating frame luminance during AE processing according to the first embodiment of the present invention;

FIG. 11 is a diagram illustrating exposure control values determined by a relation between frame display state and face detection information during AE processing according to the first embodiment of the present invention;

FIG. 12 is a block diagram showing a portion of constituent elements of a digital signal processing circuit of an image sensing apparatus according to a second embodiment of the present invention;

FIG. 17 illustrates an image sensing scene 2 according to the third embodiment of the present invention;

FIG. 18 illustrates an image sensing scene 3 according to the third embodiment of the present invention;

FIG. 20 illustrates an image sensing scene 1 according to a fourth embodiment of the present invention;

DESCRIPTION OF THE EMBODIMENTS

Preferred embodiments of the present invention will be described in detail in accordance with the accompanying drawings.

First Embodiment

Figure 1:
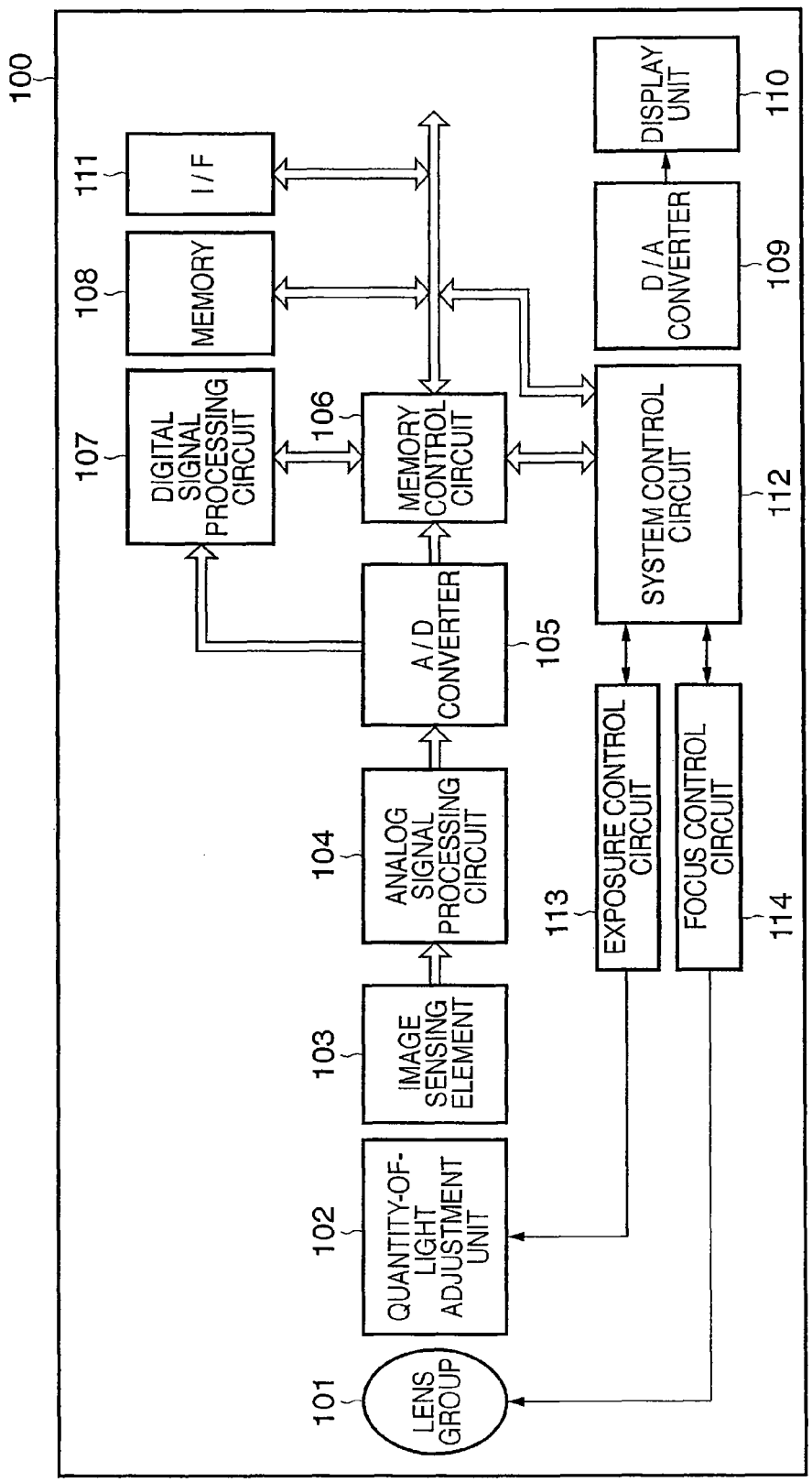
FIG. 1 is a block diagram showing the configuration of an image sensing apparatus according to a first embodiment of the present invention.

FIG. 1 is a block diagram showing the configuration of an image sensing apparatus 100 according to a first embodiment of the present invention.

In FIG. 1, the reference numeral 101 designates an image sensing lens group and 102 designates a quantity-of-light adjustment unit having an aperture device and a shutter device. The shutter device is a two-stage-type shutter. When a shutter button, not shown, is partially operated (for example, depressed halfway) and a shutter switch SW1 is switched ON, the start of such operations as AF (Auto Focus), AE (Auto Exposure), AWB (Auto White Balance) and EF (pre-flash) processing is instructed. Further, when the shutter button, not shown, is fully operated (for example, depressed fully) when the shutter switch SW1 is ON, a shutter switch SW2 is switched ON and the start of a series of processes consisting of an exposure process and a development process is instructed. Reference numeral 103 designates an image sensing element such as a CCD or a CMOS sensor, which converts light rays passing through the image sensing lens group 101 as an object image into electrical signals.

Reference numeral 104 designates an analog signal processing circuit that performs on analog signals output from the image sensing element 103 such signal processing as clamp processing, gain processing and so forth. Reference numeral 105 designates an analog/digital (A/D) converter that converts the output of the analog signal processing circuit 104 into digital signals. Reference numeral 107 designates a digital signal processing circuit, which performs predetermined pixel interpolation processing, color conversion processing and the like on digital data output from the A/D converter 105 or on data from a memory control circuit 106. In addition, the digital signal processing circuit 107 performs certain calculations using sensed image data. Based on the result of those calculations, a system control circuit 112 performs through-the-lens (TTL) auto focus (AF) processing, auto exposure (AE) processing, and pre-flash (EF) processing with respect to an exposure control circuit 113 and a focus control circuit 114. Moreover, the digital signal processing circuit 107 performs predetermined calculations using the sensed image data, and performs TTL auto white balance (AWB) processing based on the results obtained by those calculations. Further, the digital signal processing circuit 107 also executes a face detection process in which it detects the edges of the eyes, mouth and the like so as to detect the distinctive features of the face from the sensed image data, and detects the area occupied by the human face. It should be noted that, in the first embodiment of the present invention, the area in which the main object exists is detected by detecting a person's face.

The memory control circuit 106 controls the analog signal processing circuit 104, the A/D converter 105, the digital signal processing circuit 107, a memory 108, and a digital/analog (D/A) converter 109. By so doing, the analog data converted into digital data by the A/D converter 105 is written to the memory 108 either via the digital signal processing circuit 107 and the memory control circuit 106 or directly through the memory control circuit 106.

The memory 108 stores data that is displayed on a display unit 110. Data recorded on the memory 108 is output to a TFT, LCD or other such display unit 110 via the D/A converter 109 and displayed. In addition, the memory 108 is provided with sufficient memory capacity to store a predetermined number of still images and a moving image for a predetermined period of time, and stores sensed still images and moving images. Accordingly, in sequential image sensing to sequentially obtain a plural number of still images or panoramic image sensing, a large amount of image data can be written onto the memory 108 at a high speed. Further, the memory 108 may also be used as a work area for the system control circuit 112.

Reference numeral 110 designates the display unit. An electronic viewfinder function can be achieved by sequentially displaying sensed image data on the display unit 110. Further, the display unit 110 arbitrarily turns ON/OFF its display, in accordance with an instruction from the system control circuit 112. When the display is turned OFF, electric consumption of the image sensing apparatus 100 can be greatly reduced compared to when the display is turned ON. In addition, the display unit 110 displays the operating status of the apparatus, messages and so forth using text, images and the like in response to the execution of programs by the system control circuit 112.

Reference numeral 111 designates an interface for recording media such as a memory card or a hard disk. Where the interface 111 comprises one that conforms to standards such as those for PCMCIA (Personal Computer Memory Card International Association) cards or CF (Compact Flash (registered trademark)) cards, all manner of communication cards can be connected, such as LAN cards, Modem cards, USB (Universal Serial Bus) cards, IEEE (Institute of Electrical and Electronic Engineers) 1394 cards, P1284 cards, SCSI (Small Computer System Interface) cards and PHS (Personal Handy phone System) cards. By connecting these communication cards, image data and management information attached to the image data can be transmitted to and received from peripheral devices, such as another computer or a printer.

The system control circuit 112 controls the overall image sensing apparatus 100. The system control circuit 112 stores constants, variables, programs and the like needed for operation in its own internal memory.

The exposure control circuit 113 controls the shutter device and the aperture device of the quantity-of-light adjustment unit 102. The focus control circuit 114 controls focusing and zooming of the image sensing lens group 101. The exposure control circuit 113 and the focus control circuit 114 are controlled using TTL, with the system control circuit 112 controlling the exposure control circuit 113 and the focus control circuit 114 based on the results of calculations performed on the sensed image data by the digital signal processing circuit 107. A detailed description of the exposure control that the system control circuit 112 performs is given later.

Figure 2:
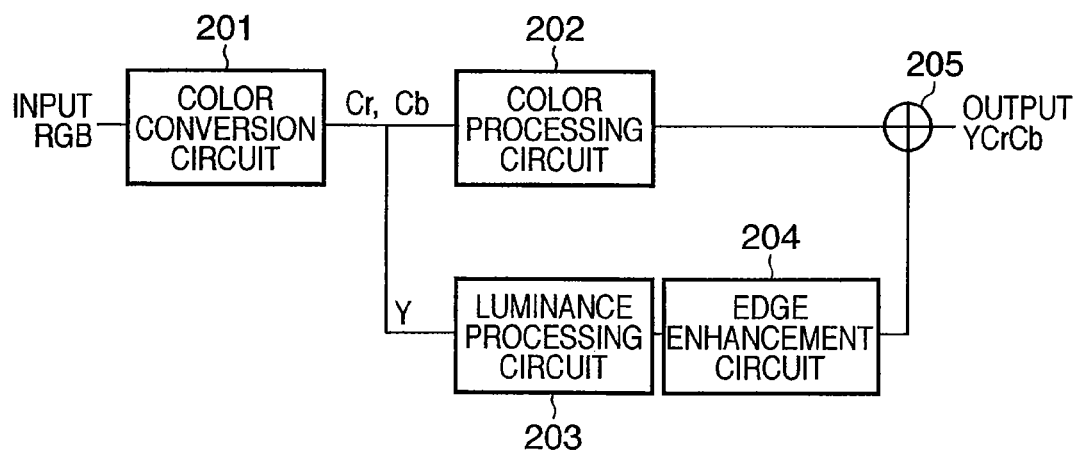
FIG. 2 is a block diagram showing a portion of constituent elements of a digital signal processing circuit of the image sensing apparatus according to the first embodiment of the present invention.

FIG. 2 is a block diagram showing a portion of constituent elements of the digital signal processing circuit 107. Reference numeral 201 designates a color conversion circuit that separates and generates the luminance signal Y and the color difference signals Cr, Cb from the RGB signals of the data output from the A/D converter 105. Reference numeral 202 designates a color processing circuit that performs AWB processing and achromatic processing that reduces high-luminance or low-luminance colors on the color difference signals Cr, Cb. Reference numeral 203 designates a luminance processing circuit that performs filter processing, luminance correction processing, gamma processing and the like on the luminance signal Y. Reference numeral 204 designates an edge enhancement circuit that performs filter processing on the luminance signal and carries out edge emphasis. The digital signal processing circuit 107 outputs a YCrCb signal created by an adder 205 combining the luminance signal Y and the color difference signals Cr, Cb processed by the luminance processing circuit 203 and the color processing circuit 202, respectively, as image data.

Next, a description is given of the operation of the image sensing apparatus 100 having the configuration described above according to the first embodiment, with reference to the flow charts of from FIG. 3 to FIG. 6. It should be noted that the programs that execute these processes are stored in the internal memory of the system control circuit 112, and are executed under the control of the system control circuit 112.

Figure 3A:
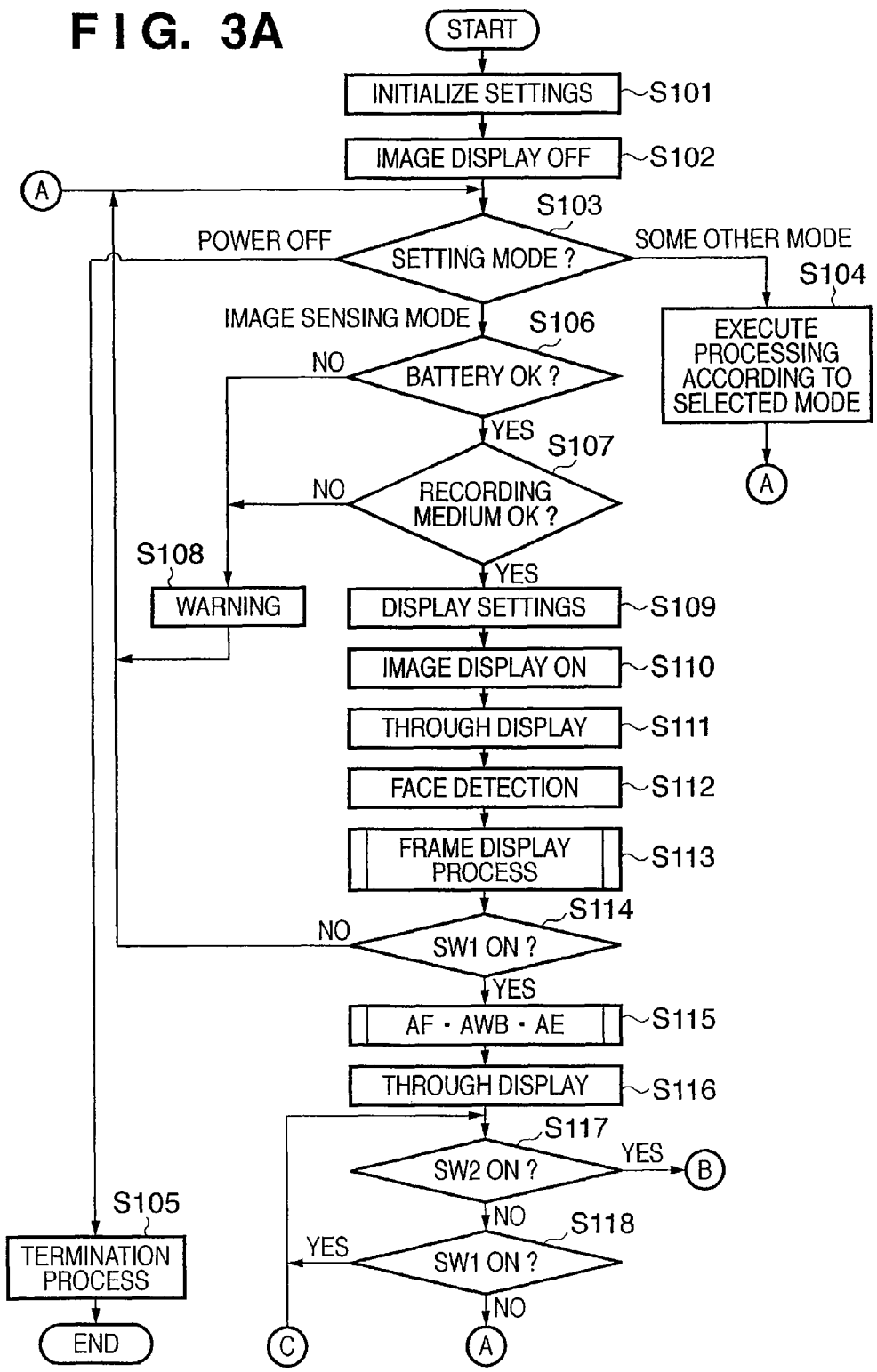

FIGS. 3A and 3B are flow charts illustrating a main processing routine of the image sensing apparatus 100 according to the first embodiment of the present invention.

In this process, when power is supplied, for example by replacing the batteries, first, in step S101, the system control circuit 112 initializes the various flags, control variables and so forth in its internal memory. In step S102, the system control circuit 112 initially sets the image display of the display unit 110 to OFF. Next, in step S103, the system control circuit 112 detects a mode setting status of the image sensing apparatus 100, and if the apparatus is set to power OFF proceeds to step S105. In step S105, the system control circuit 112 changes all displays to a termination state and records the necessary parameters, including flags, control variables and the like, and setting values as well as setting modes, in its internal memory. Then the system control circuit 112, after carrying out a predetermined termination process, such as cutting off unneeded power to all parts of the image sensing apparatus 100 including the display unit 110, ends the routine.

If in step S103 the apparatus is set to a mode other than an image sensing mode, the routine proceeds to step S104 and the system control circuit 112 executes processing according to the selected mode, returning to step S103 once that processing is finished.

If in step S103 the apparatus is set to the image sensing mode, the routine proceeds to step S106 and the system control circuit 112 determines whether or not remaining power supply capacity or operating conditions pose a problem for the operation of the image sensing apparatus 100. If the system control circuit 112 determines that there is a problem, then the routine proceeds to step S108 and, using the display unit 110 or the like, the system control circuit 112 issues a predetermined warning by image and/or sound, after which the routine returns to step S103.

If in step S106 it is determined that there is no problem with the power supply, then the routine proceeds to step S107 and the system control circuit 112 determines whether or not the operating status of the recording medium poses a problem for the operation of the image sensing apparatus 100, in particular whether or not there is a problem with the operations of recording image data to or reproducing image data from the recording medium. If it is determined that there is a problem, then the routine proceeds to step S108 and, using the display unit 110 or the like, the system control circuit 112 issues a predetermined warning by image and/or sound and the routine returns to step S103.

If in step S107 it is determined that there is no problem, then the routine proceeds to step S109 and the system control circuit 112 displays a user interface (UI) of the various settings of the image sensing apparatus 100 by image and/or by sound. It should be noted that, if the display unit 110 is turned ON, the system control circuit 112 may also use the display unit 110 and display a user interface of the various settings of the image sensing apparatus 100. In this way the user is enabled to set the settings.

Next, in step S110, the system control circuit 112 sets the image display of the display unit 110 to ON. Further, in step S111, the system control circuit 112 sets the apparatus to a through-display state that displays the sensed image data in succession. Through-display is the display of moving images generated based on signals from the image sensing element 103, and means the display of moving images for the purpose of display on the display unit 110 without the intention of recording to the memory 108 or the like.

In step S112, the system control circuit 112 causes the digital signal processing circuit 107 to carry out a face detection process to detect the face area from the image data. As a technology for detecting the face area a variety of techniques are known. For example, there are methods that use learning as typified by a neural network. In addition, there are techniques that use template matching to extract from the image area portions having the distinctive features of such physical forms as the eyes and the nose. The methods also includes a method of detecting image feature amount, such as color of skin and the shape of an eye, and statistically analyzing the image feature amount (see, for example, JP-H10-232934-A and JP-2000-48184-A). This first embodiment performs face detection processing using a technique that, as described in JP-2002-251380, detects a pair of eyes (both eyes), a nose and a mouth, and from the relative positions thereof determines the area of a person's face. In this case, if the person who is the detection target closes his or her eyes or suddenly looks aside at something, the face area cannot be detected because the pair of eyes that forms the reference does not exist.

In step S113, the system control circuit 112 causes the digital signal processing circuit 107 to accept the face detection results of step S112 and carry out a frame display process that displays a frame that shows the detection results.

Figure 4:
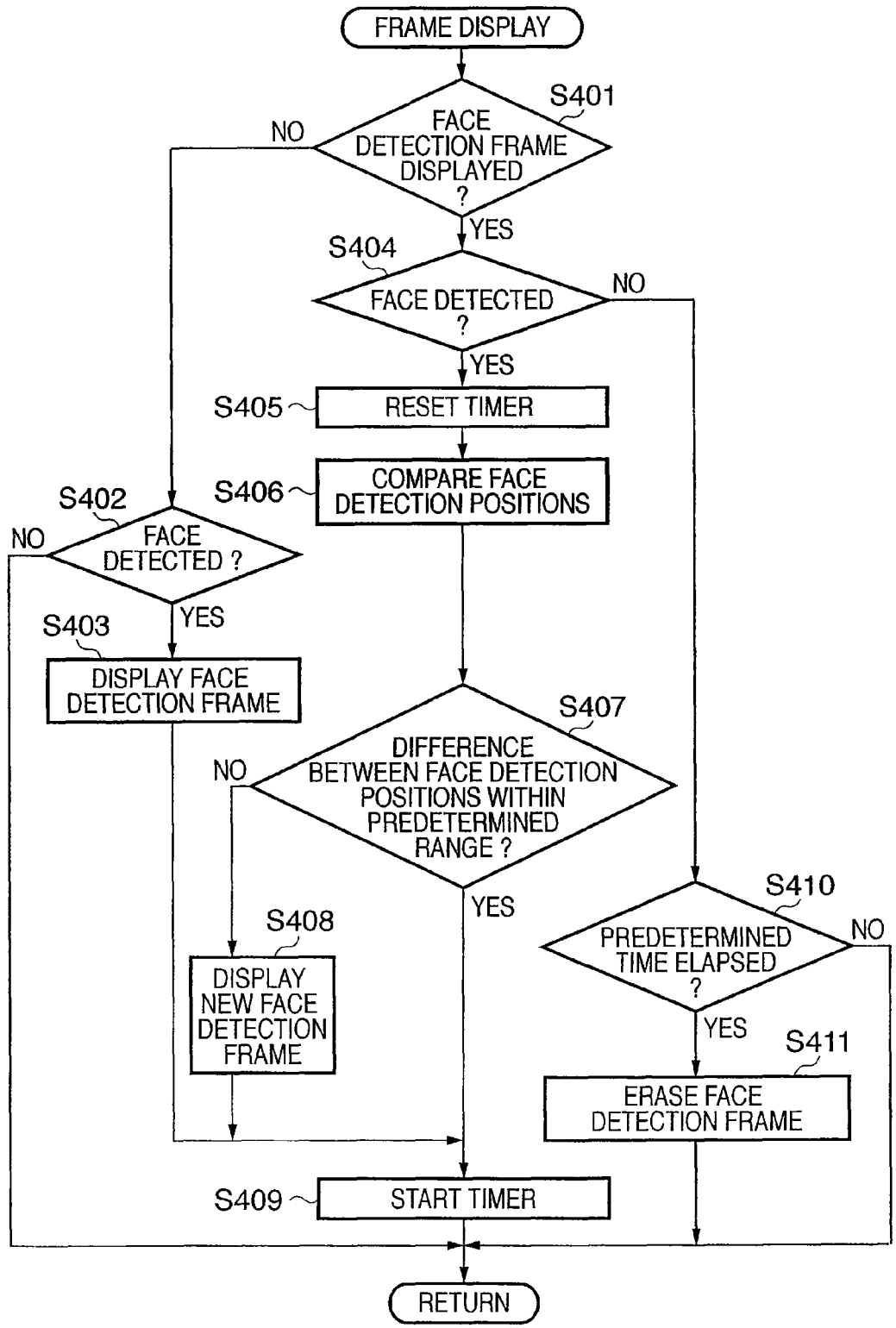
FIG. 4 is a flow chart illustrating a frame display processing routine according to the first embodiment of the present invention.

A detailed description of the frame display process carried out in step S113 is now given, using the flow chart shown in FIG. 4.

First, in step S401, the digital signal processing circuit 107 determines whether or not a frame showing the position of the detected face area (hereinafter face detection frame) is already being displayed on the display unit 110. If the face detection frame is not being displayed, the routine proceeds to step S402.

In step S402, the digital signal processing circuit 107 checks the face detection results produced in step S112, and if face detection is successful the process proceeds to step S403. If face detection is not successful the frame display process is ended. In this manner the face detection results are reflected as is in the display of the face detection frame if the face detection frame is not displayed on the display unit 110.

Figure 7A:
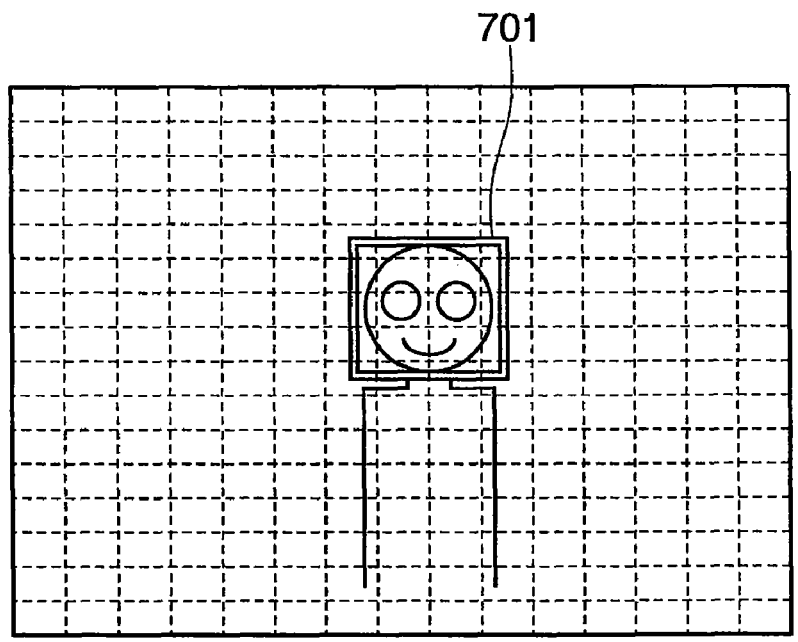
FIGS. 7A and 7B are diagrams illustrating a correspondence between a face detection frame and divided areas according to the first embodiment of the present invention.

In step S403, the display unit 110 superimposes the face detection frame on and around the face area detected in step S112, as shown in FIG. 7A. FIG. 7A shows a display frame of the display unit 110 in which the square face detection frame surrounding the head of the person detected is displayed. Once the face detection frame is displayed, the digital signal processing circuit 107 in step S409 starts a timer and the routine is ended.

In addition, if in step S401 the face detection frame is already being displayed, the routine proceeds to step S404 and the digital signal processing circuit 107 checks the face detection results produced in step S112. Then, if face detection is successful, the routine proceeds to step S405. If face detection is not successful, the routine proceeds to step S410.

In step S405, the digital signal processing circuit 107 resets the timer, and in step S406 compares the position of the face area obtained by the latest face detection process and the position of the face detection frame already being displayed.

In step S407, the digital signal processing circuit 107, from the results of the comparison performed in step S406, determines whether or not a difference between the position of the face area obtained by the latest face detection process and the position of the face detection frame is within a predetermined range. If it is determined that the difference is within the predetermined range, then the digital signal processing circuit 107 continues to display the face detection frame being displayed on the display unit 110 without setting the face detection frame to a new position.

By contrast, if in step S407 the digital signal processing circuit 107 determines that the difference between the position of the face area obtained by the latest face detection process and the position of the face detection frame is not within the predetermined range, then the routine proceeds to step S408. In step S408, the digital signal processing circuit 107, based on the position of the face area newly obtained by the latest face detection process, sets a rectangular face detection frame around the head of the person detected and superimposes it on the image data displayed on the display unit 110.

Thus, as described above, if the position of the face detection frame already being displayed and the position of the face obtained from new face detection results are close, then the position of the face detection frame is not changed because moving the face detection frame frequently instead makes it difficult to see. Conversely, if the position of the face detection frame already being displayed and the position of the face obtained from the new face detection results are not close, then the position of the face detection frame is changed to follow the position of the face of the object.

Then, the digital signal processing circuit 107 proceeds to step S409, starts the timer, and ends the routine.

If the face detection is not successful (NO at step S404), then in step S410 it is determined whether or not the timer has reached a predetermined time. If the timer has reached the predetermined time, then in step S411 the display unit 110 erases the face detection frame. If the timer has not reached the predetermined time, then the routine is ended as is.

After the frame display process routine described above is ended, if in step S114 shown in FIG. 3A the shutter button, not shown, is operated and the shutter switch SW1 is not switched ON, then the routine returns once more to step S103. Accordingly, if the shutter switch SW1 is not ON, the through-display of step S111, the face detection process of step S112 and the frame display process of step S113 are repeated. Consequently, if the person in the image being through-displayed moves, then the position of the detected face area also changes, and as a result the face detection frame also moves. It should be noted that a variety of different shapes may be adopted as the shape of the face detection frame, which may thus be circular, or follow the edge of the face of the object, or the like. In addition, the exact embodiment of the face detection frame does not matter provided that it is a display that enables a user to ascertain the detected face area, and therefore the face detection frame need not be displayed and may, for example, be a method that emphasizes the edges of the face area, or a method that blurs the area outside the face area, or the like.

Thus, as described above, when face detection succeeds (YES at step S402 or at S404), the timer starts (step S409) and thereafter the face detection frame continues to be displayed even when face detection fails if the timer has not reached the predetermined time (NO at step S410). Then, as face detection fails and the timer reaches the predetermined time (YES at step S411), the face detection frame is erased (step S411). The predetermined time that the timer counts is set longer than at least a time needed to determine the results of a next face detection carried out from a state in which face detection succeeds and the face detection frame is displayed. That is, even when face detection continuous to be not successful, the face detection frame is not erased until the timer reaches the predetermined time. However, if the predetermined time is set too long, the face detection frame becomes unable to track swiftly if the main object moves. For that reason, then, it is preferable that the predetermined time that the timer counts be set to a time such that the face detection frame is not erased if face detection fails once or twice in succession.

In this manner, even when a face is not detected, within a certain time after the previous successful face detection the possibility of face detection failure is strong, and therefore a phenomenon in which display and non-display of the face detection frame are repeated within a short interval can be prevented.

Returning to FIG. 3A, in step S114 the system control circuit 112 checks whether or not the shutter button, not shown, is pressed and the shutter switch SW1 switched ON, and if the shutter switch SW1 is not ON returns to step S103. If the shutter switch SW1 is ON the routine proceeds to step S115.

In step S115, the system control circuit 112 carries out AE processing and sets an aperture value and a shutter speed. In AE processing, if necessary the system control circuit 112 also sets the flash. Further, the system control circuit 112 also carries out AWB processing as well as AF processing, focusing the image sensing lens group 101 on the object.

Figure 5:
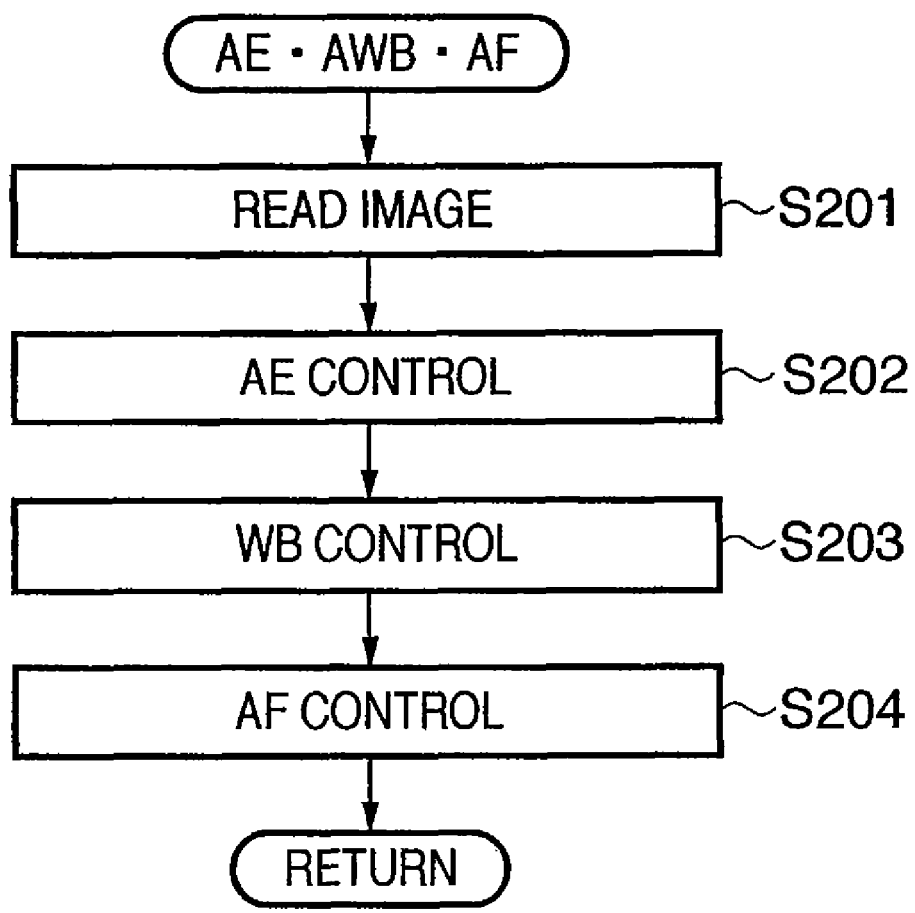
FIG. 5 is a flow chart illustrating an AE, AWB and AF processing routine according to the first embodiment of the present invention.

A detailed description is now given of the AE, AWB and AF processes carried out in step S115, using the flow chart shown in FIG. 5.

First, in step S201, electrical charge signals are read out from the image sensing element 103 and converted into digital data via the A/D converter 105, and the digital data is then input to the digital signal processing circuit 107. Using the input image data, the digital signal processing circuit 107 performs certain calculations used in the TTL AE process, EF process, AWB process, and AF process. It should be noted that these processes use only image data of the face area detected in step S112 out of all the image sensing pixels, or increase the weight of the image data of the face area, which enables calculations in the TTL AE process, EF process, AWB process, and AF process to be performed in such a way that the image data of the face area detected is optimized.

From the results of the calculations performed by the digital signal processing circuit 107 in step S201, the system control circuit 112 in step S202 determines whether or not the exposure is proper. If the exposure is improper, the system control circuit 112 causes the exposure control circuit 113 to carry out AE control. Using the measurement data obtained with AE control, the system control circuit 112 determines whether or not a flash is required. If the flash is required, the system control circuit 112 sets a flash flag, charges the flash, not shown, and prepares to fire the flash.

Once step S202 is finished, the routine proceeds to step S203 and the measurement data and/or setting parameters are stored in either the internal memory of the system control circuit 112 or the memory 108. Then, using the calculation results produced by the digital signal processing circuit 107 and the measurement data obtained with AE control, the system control circuit 112 adjusts the parameters for color processing using the digital signal processing circuit 107 and performs AWB control, after which the routine proceeds to step S204.

In step S204, the system control circuit 112 stores the measurement data and/or setting parameters stored in the memory 108 in the system control circuit 112 internal memory or the memory 108. Then, using the measurement data obtained by AE control and AWB control, the system control circuit 112 causes the focus control circuit 114 to carry out AF control, and ends AF, AWB, and AE processing.

Figure 8:
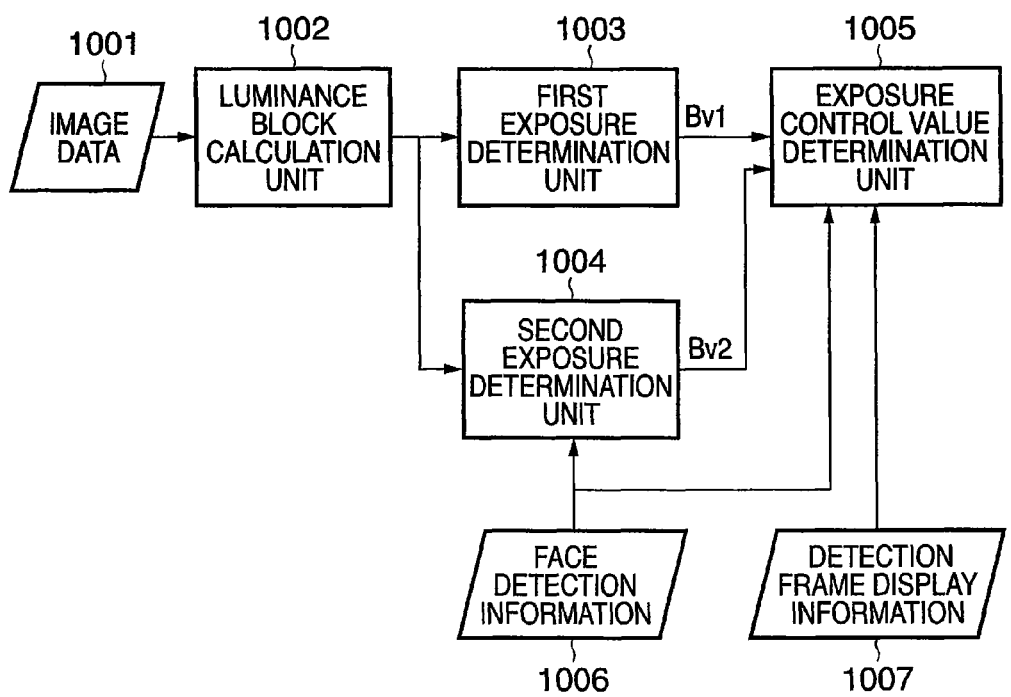
FIG. 8 is a block diagram illustrating AE control according to the first embodiment of the present invention.
Figure 9:
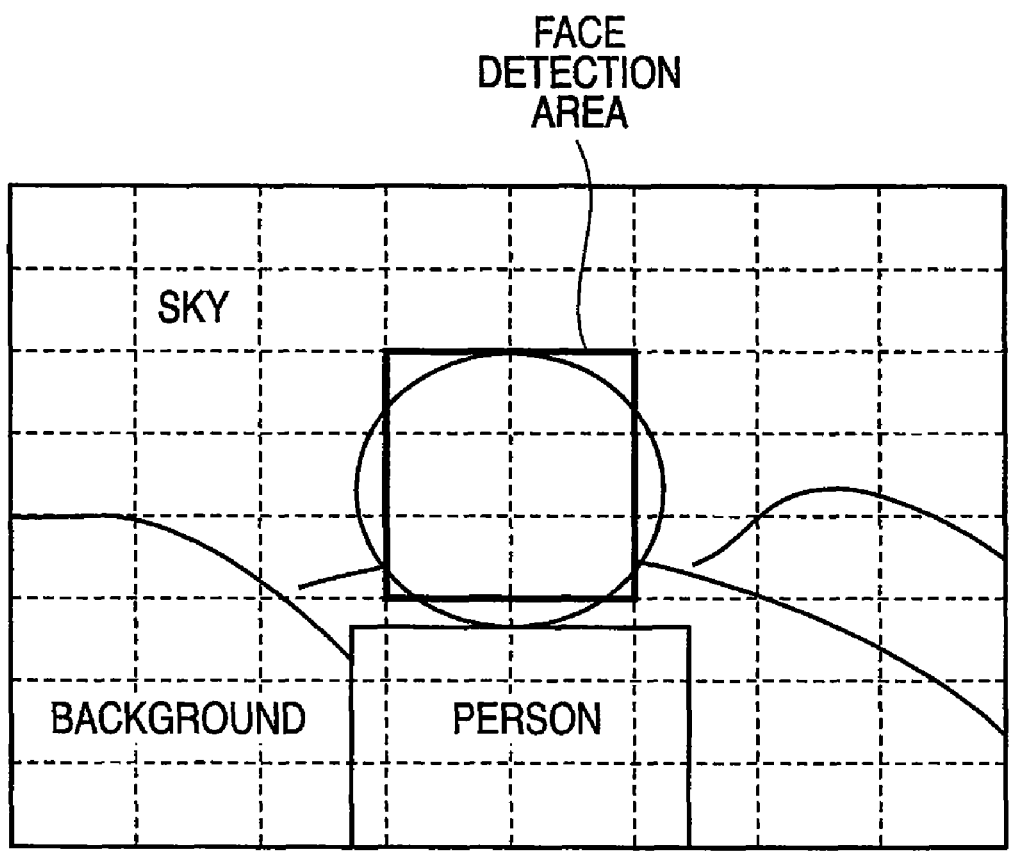
FIG. 9 is a diagram illustrating the correspondence between the face detection frame and the divided areas in the AE control according to the first embodiment of the present invention.

A more detailed description is now given of the AE control conducted by the system control circuit 112 in step S202 with reference to FIG. 8, using as an example the image sensing of a scene like that shown in FIG. 9.

First, image data 1001 is divided into 64 (8×8) blocks by a luminance block calculation unit 1002 and the average luminance value of each block is calculated. Luminance block values Yij (i=1 to 8, j=1 to 8), which are the average luminance values of the blocks, are then transmitted to a first exposure determination unit 1003 and a second exposure determination unit 1004, respectively. The first exposure determination unit 1003 then weights all the luminance blocks in the frame with the weights shown in FIG. 10 with the emphasis on the center, and adds and averages them to obtain a first luminance Y1:

$$Y1 = \Sigma(Yij \times Wij)/\Sigma Wij$$

In order that the first luminance Y1 obtained here becomes the correct luminance, an exposure value Bv1 is obtained from the first luminance Y1.

In addition, luminance block values Yij and face detection information 1006 (in this case, the coordinate position of the face and the size of the face) are transmitted to the second exposure determination unit 1004. The blocks containing the area of the face (the face detection area shown in FIG. 9) are then obtained and a second luminance Y2 that is the average luminance value of those blocks is calculated. An exposure value Bv2 at which the second luminance Y2 obtained here becomes the proper luminance is obtained from Y2. It should be noted that there is no face detection information 1006 when there is no face in the frame or when face detection has failed, and therefore the second exposure determination unit 1004, like the first exposure determination unit 1003, uses the weights shown in FIG. 10 to obtain the luminance of the overall frame.

The following formulas obtain the exposure values Bv:

$$Bv1 = \log 2(Y1/Yref) + Av + Tv - Sv$$

$$Bv2 = \log 2(Y2/Yref) + Av + Tv - Sv$$

where Yref represents a frame luminance target value, and Av, TV and Sv represent aperture value (Av), shutter speed (Tv), and sensitivity (Sv), respectively, at the time the image data is sensed.

The respective exposure values Bv1 and Bv2 thus obtained are transmitted to an exposure control value determination unit 1005. At the exposure control value determination unit 1005, an exposure control value is determined on the basis of the face detection information 1006 and face detection frame display information 1007. The detection frame display information consists of signals indicating either a state in which the face detection frame is displayed/not displayed in the frame.

FIG. 11 shows exposure values determined by the exposure control value determination unit 1005.

When there is "no face detection information" and the "frame is not displayed", the exposure value Bv1 determined by the first exposure determination unit 1003 based on the entire frame is set as the exposure control value. When "there is face detection information" and the "frame is displayed", the exposure value Bv2 determined by the second exposure determination unit 1004 based on the face displayed in the frame is set as the exposure control value. When there is "no face detection information" and the "frame is displayed", an exposure value Bv0 that is an evaluation value currently set and used during the previous AE is set as is as the exposure control value.

In other words, no change in exposure is made. By conducting control in this manner, even when no face is detected during the current face detection process, if face detection is carried out within the predetermined time measured by the timer, an exposure control value determined on the basis of that face detection information is utilized for the next image sensing. Therefore, repeated sharp fluctuations in exposure in a short interval can be prevented even when the main object looks away, blinks his or her eyes or the like and face detection temporarily fails.

Returning to FIG. 3A, in step S116 the system control circuit 112 sets the apparatus once again to the through-display state after AF/AWB/AE processing.

Next, in step S117, if the shutter switch SW2 does not switch ON, and further, the shutter switch SW1 is also released, the routine returns to step S103. By contrast, if in step S117 the shutter switch SW2 is switched ON, the routine proceeds to step S119.

In step S119, the system control circuit 112 controls the operation of a series of image sensing processes, including exposure and development. First, in the exposure process, the signals read out from the image sensing element 103 are written to the memory 108 as image data via the A/D converter 105 and the memory control circuit 106. Then, as necessary, the development process is carried out using the calculations performed by the digital signal processing circuit 107 and the memory control circuit 106.

A detailed description is now given of the above-described image sensing process (step S119), using the flow chart shown in FIG. 6.

First, in accordance with photometric data obtained with the AE process performed in step S115, the exposure control circuit 113 sets the aperture value. At the same time, the exposure control circuit 113 releases the shutter and exposes the image sensing element 103 (steps S301 and S302).

Next, in step S303, the system control circuit 112 determines from the flash flag whether or not the flash is required. If the flash is required, then the routine proceeds to step S304 and a flash unit, not shown, is pre-flashed at a predetermined flash amount. The light amount of the pre-flash is determined based on the aperture value and the distance to the object as well as on the sensitivity to which the image sensing element 103 is set. In step S305, the exposure control circuit 113 waits for the end of exposure of the image sensing element 103 in accordance with the photometric data, and in step 306 closes the shutter when that exposure end time arrives. Then, in step S307, the system control circuit 112 reads the electrical charge signals from the image sensing element 103. Then, the sensed image data is written to the memory 108 either through the A/D converter 105, the digital signal processing circuit 107, and the memory control circuit 106, or directly from the A/D converter 105 through the memory control circuit 106.

Next, the routine proceeds to step S308, and the system control circuit 112 obtains the average value of the luminance inside the face area during pre-flash and calculates a main flash amount (the light amount of the flash during actual image sensing) at which the luminance within the face area becomes the proper luminance. For example, if the image signal level of the pre-image sensing by pre-flash is the proper level, then it is sufficient that the main flash light amount be the same as that of the pre-flash. Again for example, if the image signal level of the pre-image sensing is one level too low, the system control circuit 112 calculates the main flash light amount so that it is set to twice the pre-flash light amount.

Next, in step S309, the system control circuit 112 causes the exposure control circuit 113 to release the shutter once again for main image sensing, and in step S310 the image sensing element 103 is exposed. The routine then proceeds to step S311 and the flash unit is fired at the main flash light amount obtained in step S308.

In step S312, the exposure control circuit 113 waits for the end of exposure of the image sensing element 103 in accordance with the photometric data and in step 313 closes the shutter. Then, in step S314, the system control circuit 112 reads the electrical charge signals from the image sensing element 103. Then, the sensed image data is written to the memory 108 either through the A/D converter 105, the digital signal processing circuit 107, and the memory control circuit 106, or directly from the A/D converter 105 through the memory control circuit 106. In step S315, the system control circuit 112, using the memory control circuit 106 and then if necessary the digital signal processing circuit 107, reads out the image data written to the memory 108 and executes a vertical addition process on the read-out image data. Then, the system control circuit 112, in step S316, after successively carrying out color processing, in step S317 writes the now-processed display image data to the memory 108 and ends the image sensing process routine (step S119).

Once the image sensing process of step S119 is executed as described above, the routine proceeds to step S120 and a quick review display is executed on the display unit 110, providing display based on the image data obtained in step S119. During image sensing as well, an image is always displayed on the display unit 110 as an electronic viewfinder, and also provides quick review display immediately after image sensing.

In step S121, the system control circuit 112 reads out the sensed image data written to the memory 108 and executes a variety of image processes on the sensed image data using the memory control circuit 106 and as necessary the digital signal processing circuit 107. In addition, after performing image compression, the system control circuit 112 executes a recording process that writes the compressed image data to a storage medium, not shown.

After the recording process of step S121 is finished, in step S122 it is determined whether or not the shutter switch SW2 is ON. If the shutter switch SW2 is ON, then the routine proceeds to step S123 and the system control circuit 112 determines the status of a sequential flag stored in the system control circuit 112 internal memory or in the memory 108. If the sequential flag is ON, then the system control circuit 112 returns to step S119 in order to carry out sequential image sensing and carries out the next image sensing. By contrast, if the sequential flag in not ON in step S123, the system control circuit 112 returns to step S122 and repeats the processes of steps S122 and S123 until the shutter switch SW2 is released.

Thus, according to the first embodiment, when set to carry out quick review display immediately after image sensing, it is determined whether or not the shutter switch SW2 is pressed when the recording process (step S121) ends. If the shutter switch SW2 is ON, then quick review display continues on the display unit 110 until the shutter switch SW2 is released. As a result, a careful check of the sensed image can be carried out.

If the shutter switch SW2 is switched OFF immediately after the recording process of step S121 as described above, the routine proceeds from step S122 to step S124. If, after step S121, the shutter switch SW2 is switched OFF after the shutter switch SW2 remains ON, quick review display is continued, and the sensed image is checked, the routine proceeds from step S122 through step S123 to step S124. Then, in step S124, after waiting for a predetermined minimum review time to elapse, the routine proceeds to step S125. It should be noted that the minimum review time is the time to display the quick review and can be set from a menu screen or the like.

In step S125, the system control circuit 112 sets the display state of the display unit 110 to through-display and proceeds to step S126, which enables the display unit 110 to be put into a through-display state that successively displays sensed image data for the next image sensing after the sensed image is checked using the quick review on the display unit 110.

In step S126, it is determined whether or not the shutter switch SW1 is ON, and if so the routine proceeds to step S117 in preparation for the next image sensing. In addition, if in step S126 the shutter switch SW1 is OFF, the series of image sensing operations is ended and the routine returns to step S103.

Thus, as described above, with the first embodiment, even when face detection fails, if within a certain time after the previous successful face detection, the exposure control value is determined on the basis of the original face area.

It should be noted that, although in the first embodiment Bv0, which is the value currently set and used for the previous AE, is set as is as the exposure control value when there is "no face detection information" and the "frame is displayed", alternatively, an evaluation value may be calculated on the basis of the luminance of the area of the frame currently being displayed.

This is because, if the face is temporarily lost because the person who is the object has blinked or looked aside, it is presumed that there is no great difference between the evaluation value obtained from a full frontal face and an evaluation value calculated on the basis of the area within the frame.

Second Embodiment

Next, a description is given of a second embodiment of the present invention.

The second embodiment, as shown in FIG. 12, adds a BPF 1305 and a scene detection unit 1306 to the configuration of the digital signal processing circuit 107 described in the first embodiment with reference to FIG. 2. The remainder of the structure is the same as that described with reference to FIG. 1 and FIG. 2, and therefore identical reference numerals are attached thereto and a description thereof is omitted. In addition, the frame display process performed in step S113 shown in FIG. 3A is different from that of the first embodiment described with reference to FIG. 4. The remaining processes are identical to the processes described in the first embodiment, and therefore a description thereof is omitted and a description of the frame display process is given with reference to FIG. 13.

Figure 13:
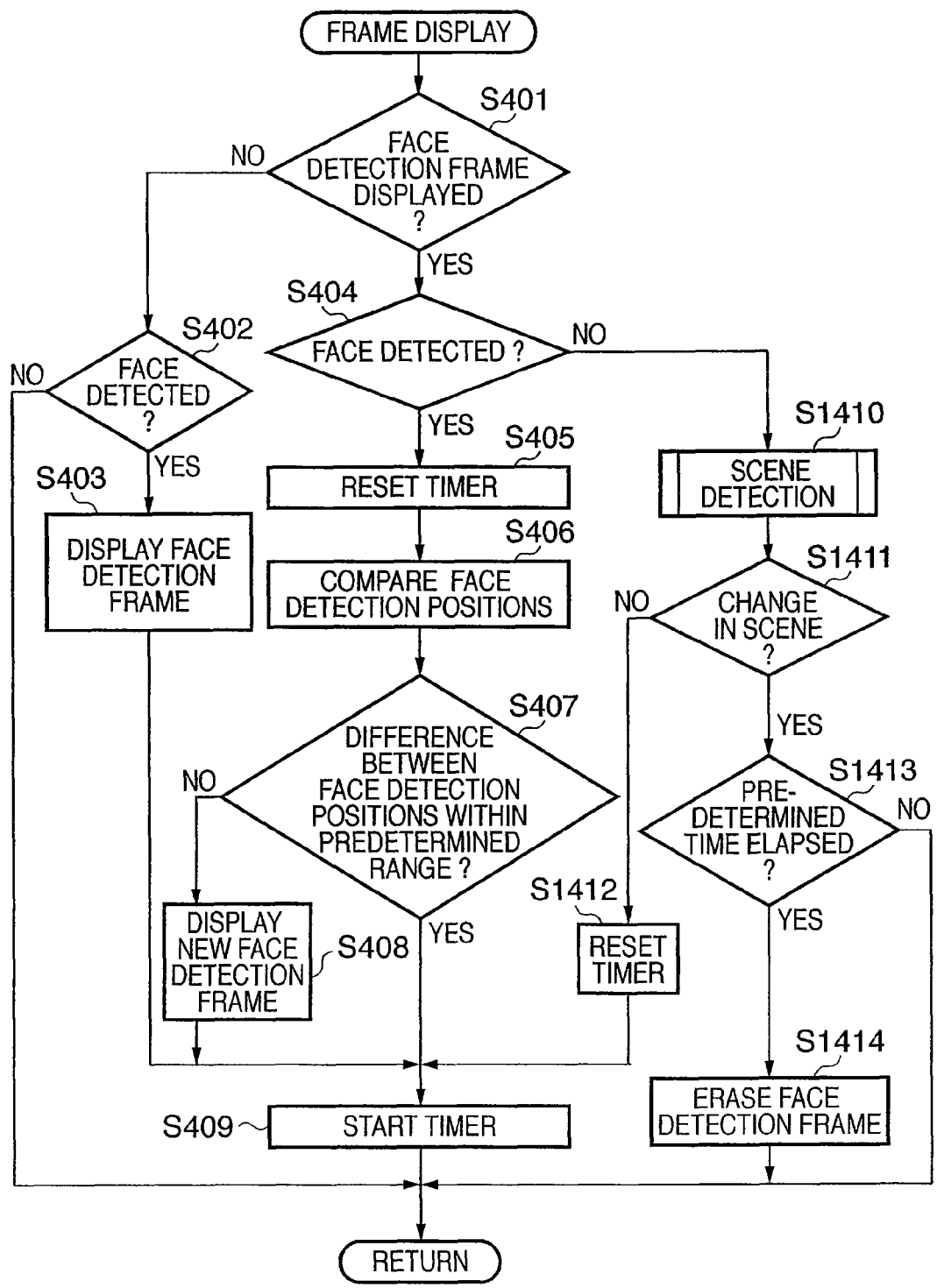
FIG. 13 is a flow chart illustrating a frame display processing routine according to the second embodiment of the present invention.

In FIG. 13, from step S401 to step S409 is the same as from step S401 to step S409 described with reference to FIG. 4, and therefore a description thereof is omitted.

In the second embodiment, in step S404 the results of the face detection carried out in step S112 shown in FIG. 3A are checked. If face detection is not successful, the routine proceeds to step S1410. In step S1410, the digital signal processing circuit 107 carries out a scene detection process in order to determine whether there has been a change in the state of the object.

Figure 7B:
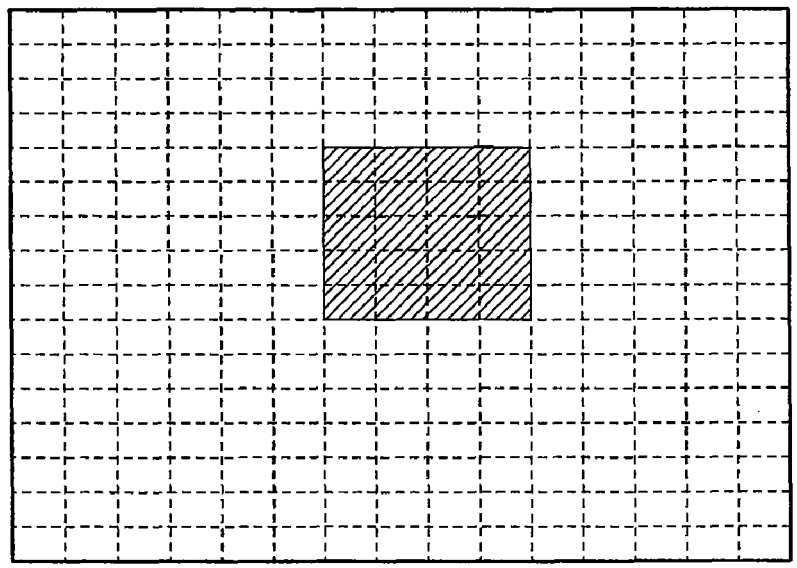
Figure 14:
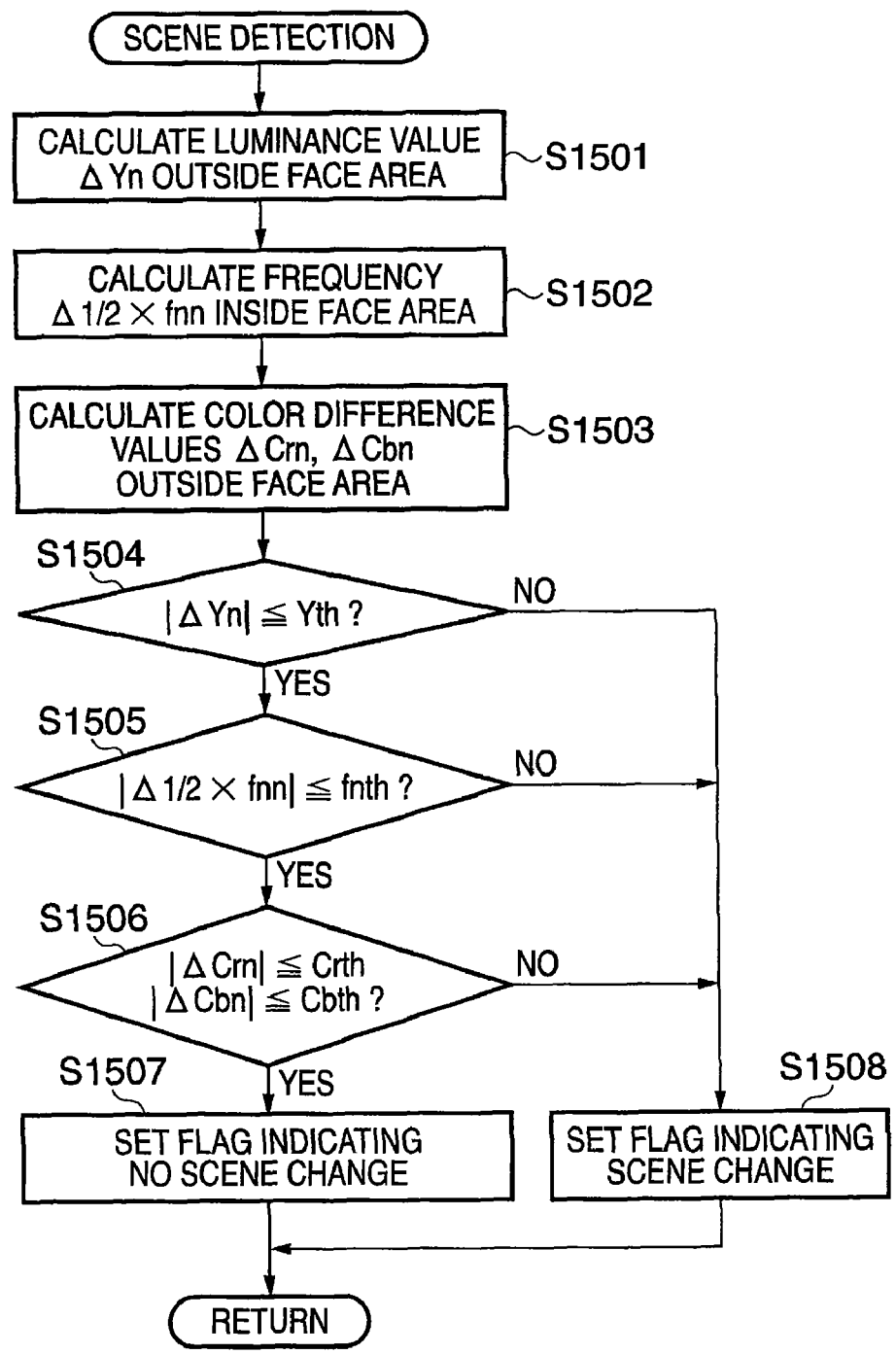
FIG. 14 is a flow chart illustrating a scene detection processing routine according to the second embodiment of the present invention.
Figure 15A:
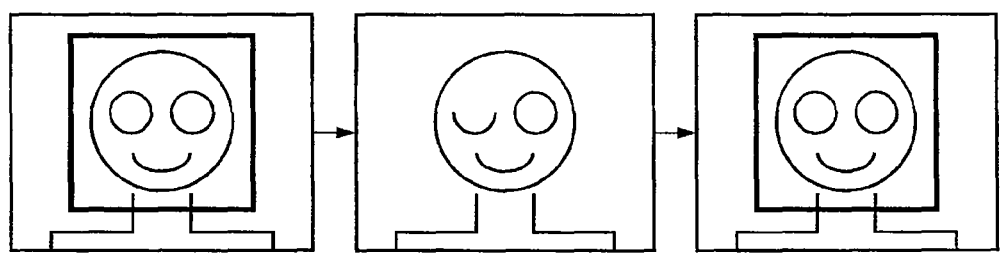
FIGS. 15A and 15B are diagrams showing examples of conventional face detection displays.
Figure 15B:
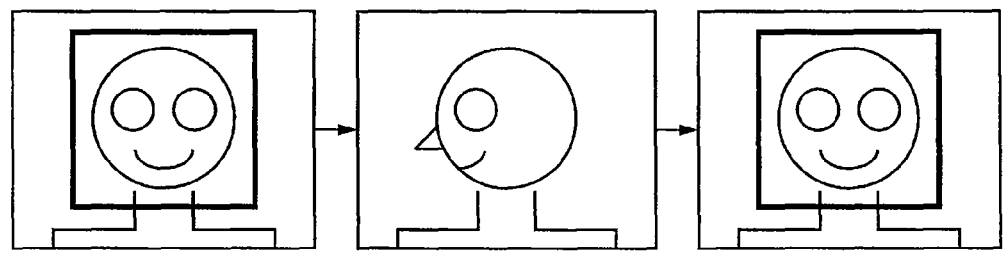

A detailed description is now given of the scene detection process carried out in step S1410, using the flow chart shown in FIG. 14 and the drawings showing divided areas shown in FIG. 7A and FIG. 7B.

FIG. 7A shows a display screen of the display unit 110, and FIG. 7B shows the divided areas of the image sensing element 103. The broken lines of FIG. 7B indicate the boundaries of the divided areas, and in order to facilitate the description the same broken lines as in FIG. 7B are shown in FIG. 7A. In FIG. 7B, slanted lines are drawn in the divided areas over Which the face detection frame of FIG. 7A is laid.

In step S1501, from the immediately preceding sensed image data the digital signal processing circuit 107 detects the luminance signals of each of the divided areas over which the face detection frame is not laid (in FIG. 7B, the areas in which there are no slanted lines). Then, the digital signal processing circuit 107 compares these luminance signals with the luminance signals of corresponding divided areas of the newest image data used in face detection and calculates a difference ΔYn.

In step S1502, the digital signal processing circuit 107 converts the immediately preceding sensed image data to a particular frequency at each of the divided areas over which the face detection frame is laid (in this embodiment, (½)×fnn, which is half the Nyquist frequency). Then, the digital signal processing circuit 107 compares the frequencies of the divided areas with frequencies obtained by a similar method in corresponding divided areas of the newest image data used in face detection and calculates a difference Δ(½)×fnn.

In step S1503, from the immediately preceding sensed image data the digital signal processing circuit 107 detects the color difference signals of each of the divided areas over which the face detection frame is not laid. Then, the digital signal processing circuit 107 compares these color difference signals and the color difference signals of corresponding divided areas of the newest image data used in face detection and calculates differences ΔCrn, ΔCbn.

In step S1504 the digital signal processing circuit 107 at each divided area determines whether or not an absolute value of the ΔYn calculated in step S1501 is at or below a threshold value Yth. In addition, in step S1505, at each divided area the digital signal processing circuit 107 determines whether or not an absolute value of the Δ(½)×fnn calculated in step S1502 is at or below a threshold value fnth. In addition, in step S1506, at each divided area the digital signal processing circuit 107 determines whether or not absolute values of the ΔCrn, ΔCbn calculated in step S1503 are at or below threshold values Crth, Cbth.

If as a result of these determinations all the conditions of step S1504 through step S1506 are satisfied, the digital signal processing circuit 107 determines that the change that has occurred in the state of the object is small. Then, in step S1507, the digital signal processing circuit 107 sets a flag indicating that there is no scene change.

Conversely, if any of the conditions of step S1504 through step S1506 is not satisfied, the digital signal processing circuit 107 determines that the change in the state of the object is not small and in step S1508 sets a flag indicating that there is a scene change.

Once either flag is set, the routine ends.

To return to FIG. 13, in step S1411 the digital signal processing circuit 107 determines whether or not the flag indicating there is a scene change is set, and if set, proceeds to step S1413. If the flag indicating there is a scene change is set, then it is presumed that the change in state of the object is not small, and the possibility that the object face detection frame captures the head of the object is probably slight. As a result, in step S1413 it is determined whether or not the timer has reached the predetermined time, and if so, in step S1414 the display unit 110 erases the face detection frame. If in step S1413 the timer has not reached the predetermined time, this routine is ended.

In addition, if in step S1411 the flag indicating that there is a scene change is not set, in step S412 the timer is reset. Then, the digital signal processing circuit 107 continues to display the face detection frame already being displayed on the display unit 110 without setting the face detection frame to a new position. This is because, if the flag indicating there is a scene change is not set, the change in the state of the object is probably small. In other words, there is a strong possibility that face detection has failed as a result of the object blinking his or her eyes or suddenly looking away. As a result, it is presumed that although face detection has failed there is no great change in the position of the head of the object, and therefore the face detection frame already being displayed continues to be displayed.

Then, in step S409, the timer is started and the routine is ended.

Thus, as described above, in the second embodiment, when it is determined that face detection has succeeded (YES at step S402 or S404) or that there is no scene change (NO at step S1411), the timer is started (step S409). Thereafter, if face detection fails and as a result of the scene detection process it is presumed that the change in the state of the object is not small (YES at step S1411), and further, if the timer has reached a predetermined time (YES at step S1413), it is determined that the face detection frame has not captured the main object. Then, the face detection frame is erased (step S1414). Conversely, if as a result of the face detection process it is presumed that the change in the state of the object is small (NO at step S1411), it is determined that face detection has failed but that the position of the main object has not changed, the face detection frame continues to be displayed as is, and the timer is also reset (step S1412).

Here, the predetermined time that the timer counts is set longer than at least a time needed to determine the results of a next face detection carried out from a state in which face detection succeeds and the face detection frame is displayed. That is, even when face detection continues to be not successful, the face detection frame is not erased until the timer reaches the predetermined time. However, if the predetermined time is set too long, the face detection frame becomes unable to track swiftly if the main object moves. For this reason, then, it is preferable that the predetermined time that the timer counts be set to a time such that the face detection frame is not erased if face detection fails once or twice in succession.

In this manner, when face detection fails but it is presumed that the change in state of the object is small, in the same way as when face detection succeeds, the face detection frame continues to be displayed and the timer is reset and started. That is, even if a face is not detected, when it is presumed that the change in state of the object is small, the display time of the face detection frame is longer than when it is presumed that the change in state of the object is not small. Accordingly, the possibility that the face detection frame is erased is small if all the object does is blink his or her eyes or suddenly turn away, thus making it possible to eliminate the phenomenon in which display and non-display of the face detection frame are repeated within a short interval.

In addition, because AE control is linked to the face detection frame display, the phenomenon in which exposure fluctuates repeatedly in a short interval can be eliminated.

It should be noted that, in the second embodiment, after the face detection frame is displayed, in step S409 the timer is started, and moreover, in step S1414, it is detected that the timer has reached the predetermined time and the face detection frame is erased. However, if a configuration is adopted in which the face detection frame is erased as soon as face detection fails, and further, it is presumed from the scene detection process that the change in the state of the object is not small, then the timer itself becomes unnecessary.

In addition, the second embodiment uses differences in luminance signals (ΔYn), differences in values converted to a particular frequency (Δ(½)×fnn), and differences in color difference signals (ΔCrn, ΔCbn) at each of the divided areas as reference criteria for determining the setting of the flag that indicates that there is a scene change. However, as the reference criteria, all these signals may be used or only a portion of these signals may be used. Moreover, signals obtained at a plurality of divided areas or signals obtained from all areas, without obtaining differences in signals obtained at each of the divided areas, may be averaged, weighted, and so forth.

Third Embodiment

Next, a description is given of a third embodiment of the present invention.

The third embodiment differs from the first embodiment in that multiple faces are detected. In addition, and in consequence thereof, in step S202 shown in FIG. 5, the exposure control value acquisition method for the AE control carried out by the system control circuit 112 differs from that described in the first embodiment. The remaining processes are identical to the processes described in the first embodiment, and therefore a description thereof is omitted and the following describes the exposure control value acquisition method for AE control with reference to from FIG. 16 to FIG. 19, showing the state of display of the face detection frame. It should be noted that from FIG. 16 to FIG. 19 represents a continuously sensed scene. In addition, the predetermined time set in the timer is 0.6 seconds, the interval between continuously sensed scenes is 0.2 seconds, and a single face detection requires 0.2 seconds. It should be noted that the predetermined time set in the timer, the interval between continuously sensed scenes, and the face detection processing time are not limited to the times described above. Moreover, an exposure control value is obtained and AE control is carried out at every image sensing.

Figure 16:
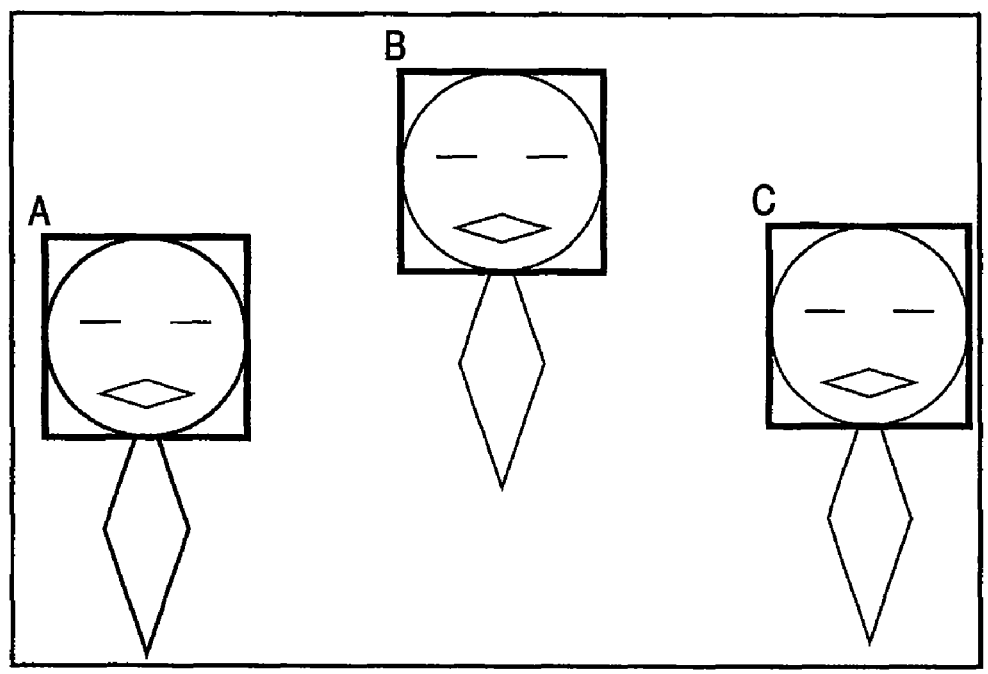
FIG. 16 illustrates an image sensing scene 1 according to a third embodiment of the present invention.

FIG. 16, face areas A, B and C of three persons who are objects are each detected. Therefore, the exposure value Bv1 in FIG. 16 is calculated by a second exposure determination unit 1404 based on face area A, B and C luminance values.

Next, in FIG. 17 (0.2 seconds after FIG. 16), although face detection is successful for face areas B and C, in face area A the face is turned away and therefore face detection frame fails. However, even if face area A detection fails, until the time counted by the timer reaches the predetermined time the display unit 110 continues to display the face detection frame of face area A.

In other words, because the counted time from when the detection of face area A succeeds (the time shown in FIG. 16) to the time shown in FIG. 17 when face detection fails is 0.2 seconds, at the time shown in FIG. 17 the display unit 110 continues to display the face detection frame.

Therefore, the exposure value Bv2 shown in FIG. 17 is calculated by the second exposure determination unit 1404 based on the luminance value of face area A shown in FIG. 16 and the luminance values of the face areas B and C shown in FIG. 17, which are the newest face detection information.

In addition, since face detection of face area A in FIG. 17 has failed, the luminance values of the face areas B and C for which face detection is successful in FIG. 17 may be deemed to be more reliable than the luminance value of face area A shown in FIG. 16, and weighted more heavily.

Next, in FIG. 18 (0.2 seconds after FIG. 17), face area A continues to remain undetected from the time of FIG. 17 (0.4 seconds having elapsed since the previous successful face detection of face A), in addition to which face area C cannot now be detected (0.2 seconds having elapsed since the previous successful face detection of face C).

Although face detection has failed for face areas A and C, the counted time from the previous successful face detection for both until the time shown in FIG. 18 is still shorter than the 0.6 seconds set in the timer as the predetermined time, and therefore face detection frames for face areas A and C continue to be displayed on the display unit 110 even at the time shown in FIG. 18. Therefore, an exposure control value Bv3 in FIG. 18 is calculated by the second exposure determination unit 1404 based on the luminance value of face area A in FIG. 16, the luminance value of face area C in FIG. 17, and the luminance value of face area B for which face detection is successful in FIG. 18.

In addition, because face detection for face area A and C in FIG. 18 has failed, compared to the luminance value of face area A in FIG. 16 and the luminance value of face area C in FIG. 17, the luminance value of face area B for which face detection is successful in FIG. 18 may be deemed to be more reliable, and weighted more heavily.

Further, between face area A in FIG. 16 and face area C in FIG. 17, face area C may be deemed to be more reliable because it is chronologically newer, and face area C in FIG. 17 may be weighted more heavily than face area A in FIG. 16.

Figure 19:
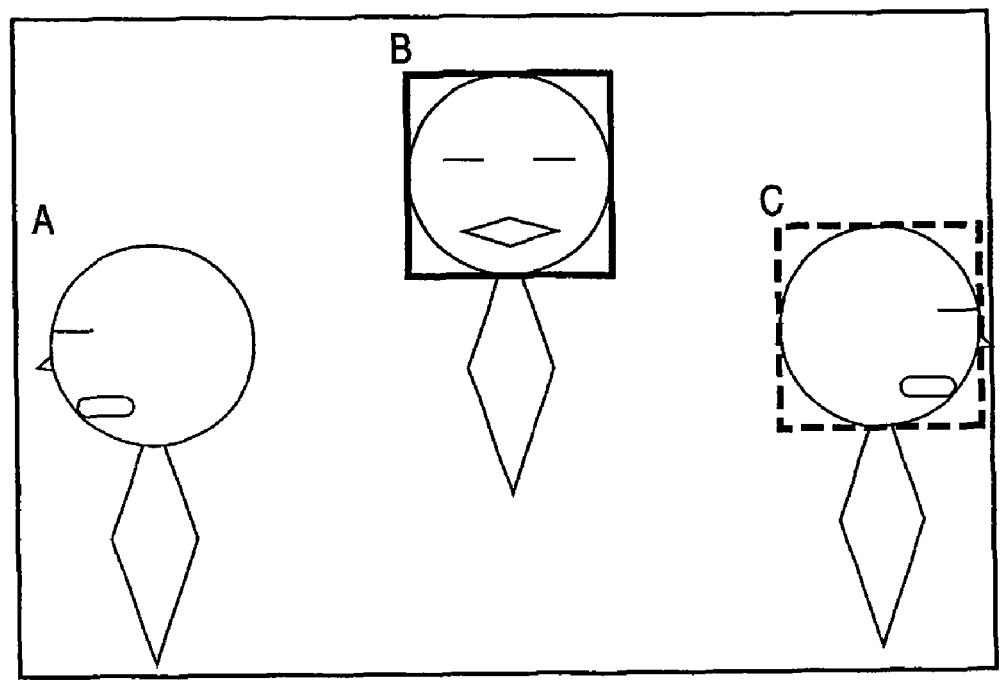
FIG. 19 illustrates an image sensing scene 4 of according to the third embodiment of the present invention.

Next, in FIG. 19 (0.2 seconds after FIG. 18), face areas A and C continue to remain undetected (0.6 seconds having elapsed since the previous successful face detection of face area A and 0.4 seconds having elapsed since the previous successful face detection of face area C).

With respect to face area A, the time counted from the previous successful face detection of face area A to FIG. 19 has reached the 0.6 seconds that is the predetermined time set in the timer, and therefore the face detection frame is erased.

Although face detection of face area C has failed, the counted time since the previous successful face detection of face area C is still shorter than the predetermined time of 0.6 seconds set in the timer, and therefore the face detection frame of face area C continues to be displayed on the display unit 110 at the time shown in FIG. 19.

Therefore, an exposure value Bv4 in FIG. 19 is calculated by the second exposure determination unit 1404 based on the luminance value of FIG. C shown in FIG. 17 and the luminance value of face area B for which face detection is successful in FIG. 19.

In addition, because face detection of face area C in FIG. 19 has failed, compared to the luminance value of face area C in FIG. 17 the luminance value of face area B for which face detection is successful in FIG. 19 may be deemed to be more reliable, and weighted more heavily.

Thus, as described above, in the third embodiment, when multiple face areas are detected, even when there are areas for which face detection fails, areas for which the time elapsed since the previous successful face detection thereof is within a predetermined time and areas for which face detection succeeds are taken into account when controlling exposure.

It should be noted that although in the third embodiment exposure control value is determined using the luminance value of the face area obtained in the previous successful face detection, alternatively, even if face detection fails in the current face detection, if time from when the face area is successfully detected to the current face detection is within a predetermined time, the exposure control value may be calculated based on the luminance value of the area of the current image in the displayed face detection frame.

In addition, although in the present embodiment a face area for which face detection has failed but the time elapsed since the previous successful face detection is within the predetermined time is indicated by broken lines, alternatively, as a display embodiment of the display unit 110, such an area may be displayed in the same way as the frame of an area for which face detection is successful.

Fourth Embodiment

Next, a description is given of a fourth embodiment of the present invention.

In the fourth embodiment, the distinctive feature is that, from among a plurality of detected faces a single face is selected to be the main object, and exposure control is carried out based on face detection results for that main object.

Here, the predetermined time set in the timer is 0.3 seconds, the interval between continuously sensed scenes is 0.2 seconds, and a single face detection requires 0.2 seconds.

As shown in FIG. 20, when three faces A, B and C are detected, from among the three faces the face that is to become the main object is detected. This main object detection involves using a degree of face reliability FR, face size FS and face distance from the center of the frame FD of each face, obtaining an evaluation value FV using the following formula, and making that with the largest evaluation value the main object. In addition, a frame is displayed for the object with the largest evaluation value.

$$FV = FR \times FS/FD$$

For example, in the scene shown in FIG. 20, the face of B is recognized as the main object (here, a frame is displayed on the display screen only for B; even though face detection is successful for A and C, no frame is displayed on the display screen). The exposure value Bv0 here is obtained from the following formula, where the brightnesses of the faces of A, B and C are YA, YB and YC, respectively:

$$Y0 = (YA + 2 \times YB + YC)/4$$

$$Bv0 = \log 2(Y0/Yref) + Av + Tv - Sv$$

Figure 21:
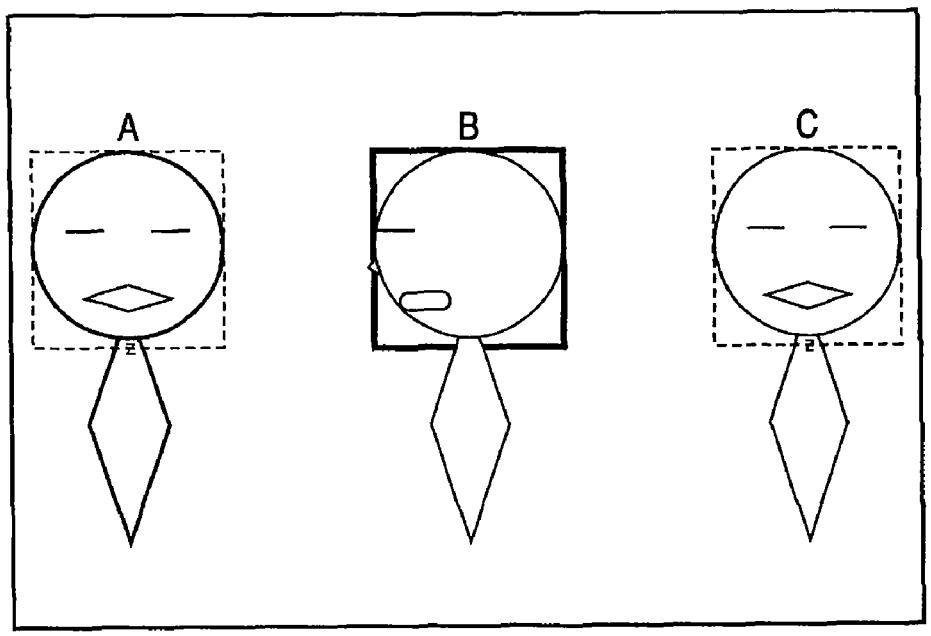
FIG. 21 illustrates an image sensing scene 2 according to the fourth embodiment of the present invention.

In FIG. 21 (0.2 seconds after FIG. 20), even though the main object looks away and face detection fails, because the predetermined time has not elapsed the frame continues to be displayed. In this case, the frame is displayed without the face of the main object being detected, and therefore the exposure is not updated and Bv0 becomes the exposure value for this frame.

Figure 22:
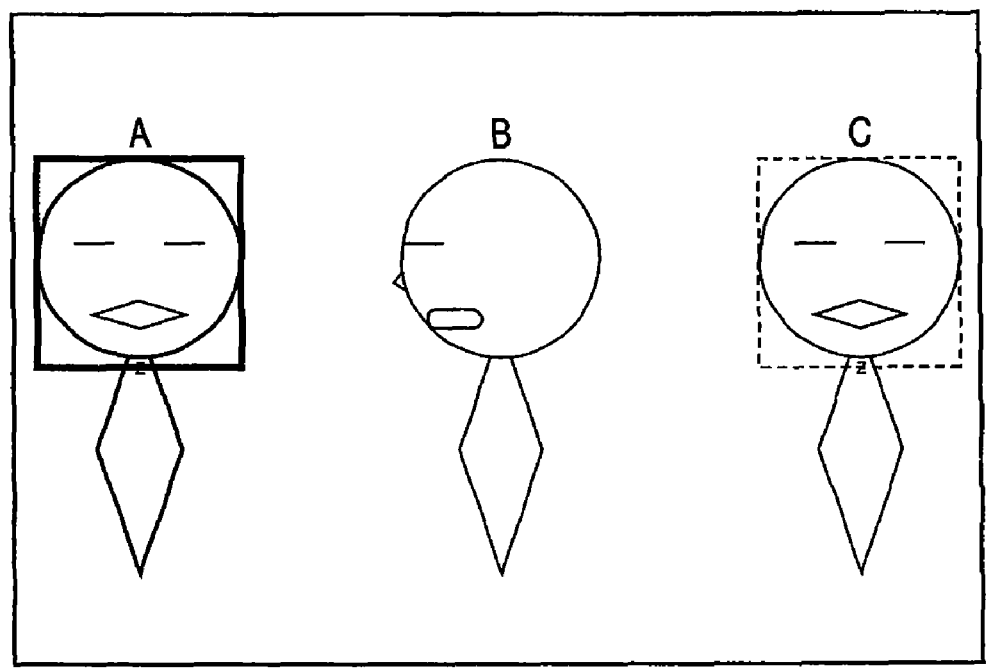
FIG. 22 illustrates an image sensing scene 3 according to the fourth embodiment of the present invention.

Next, if B turns aside as shown in FIG. 22 (0.2 seconds after FIG. 21), the time during which the main object is not detected exceeds the predetermined time, and therefore the frame is erased. Then, at this time, if the evaluation value of A is higher than the evaluation value of C, A is selected as the main object. The exposure at this time becomes as follows:

$$Y1 = (2 \times YA + YC)/3$$

$$Bv1 = \log 2(Y1/Yref) + Av + Tv - Sv$$

Figure 23:
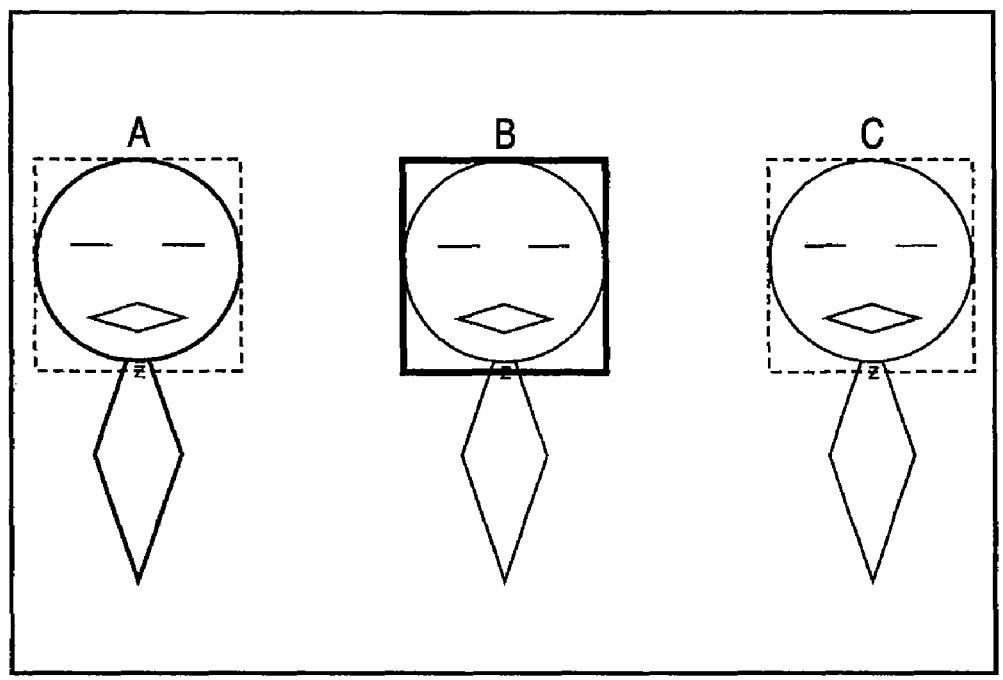
FIG. 23 illustrates an image sensing scene 4 according to the fourth embodiment of the present invention.

Next, if B turns to face the front and his or her face is detected as shown in FIG. 23 (0.2 seconds after FIG. 22), B is set as the main object and the exposure is obtained as follows:

$$Y2 = (YA + 2 \times YB + YC)/4$$

$$Bv2 = \log 2(Y2/Yref) + Av + Tv - Sv$$

where YA, YB and YC are the same values as those in FIG. 20, and Bv2=Bv0.

Although in the first, second, third and fourth embodiments described above a description is given of cases of detecting the face as the object, the present invention is not limited to the face. Accordingly, the present invention can be adapted to anything that detects an object that satisfies a preset condition.

Moreover, in the first, second and third embodiments described above the exposure control value determination unit 1005 sets either Bv0, Bv1, or Bv2 as the exposure control value based on the face detection information 1006 and the face detection frame display information 1007. However, determination of the exposure control value and display of the face detection frame are separate and independent actions, and alternatively, the exposure control value of the present invention may be determined by balance between face detection results and accuracy of, and conditions relating to, face detection. In the first, second and third embodiments described above, as one example of the determination of the accuracy and the conditions relating to face detection, the determination as to whether or not to display the face detection frame is utilized, using the face detection frame display information 1007. Therefore, in place of or in addition to the process of displaying/erasing the face detection frame in the processes shown in FIG. 4 and FIG. 13, information indicating that conditions are satisfied or not satisfied may be held, and that information, instead of the face detection frame display information 1007, may be supplied to the exposure control value determination unit 1005.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-208932, filed on Jul. 31, 2006, which is hereby incorporated by reference herein in its entirety.

What is claimed is:

1. An image sensing apparatus configured to carry out image sensing and acquiring image data of an image, comprising:

a detection unit configured to detect an object area in the image that satisfies a preset condition based on the acquired image data;

a determination unit configured to determine whether or not there is a change in scene between said each input image and an image input immediately prior to said image;

a first exposure value determination unit configured to calculate a first exposure value based on said image data;

a second exposure value determination unit configured to calculate a second exposure value based on luminance of the object area detected by said detection unit; and a selection unit configured to select said second exposure value if the object area is detected, select said first exposure value if the object area is not detected, and if it is determined by said determination unit that there is a change in scene, and further if a predetermined time has elapsed since the object area was detected previously or since no change in scene was detected previously, and select not to change the exposure value if the object area is not detected, and if it is determined by said determination unit that there is a change in scene, and further if the predetermined time has not elapsed since the object area was detected previously or since no change in scene was detected previously.

2. The image sensing apparatus according to claim 1, further comprising a display control unit configured to, if the object area is detected by said detection unit, superimpose a display showing said detected object area on an image based on the acquired image data for a predetermined time period after the detection or for a predetermined period of time, after the detection, since it was determined by said determination unit that there is no change in scene,
    wherein said selection unit, if the object area is not detected, determines that a predetermined time has not elapsed since the object area was detected previously or since a previous determination by said determination unit that there is no change in scene if said display showing the object area is displayed.

3. The image sensing apparatus according to claim 1, wherein said second exposure value determination unit calculates the second exposure value based on luminance of a range of a portion that includes the object area detected by said detection unit within said image data.

4. The image sensing apparatus according to claim 1, wherein said second exposure value determination unit weights luminance of a range of a portion that includes the object area detected by said detection unit within said image data more heavily than luminance outside said range of a portion.

5. A control method for an image sensing apparatus configured to carry out image sensing and acquiring image data of an image, said control method comprising:
    a detection step of detecting an object area in the image that satisfies a preset condition based on the acquired image data;
    a determination step of determining whether or not there is a change in scene between said each input image and an image input immediately prior to said image;
    a first exposure value determination step of calculating a first exposure value based on said image data;
    a second exposure value determination step of calculating a second exposure value based on luminance of the object area detected in said detection step; and
    a selection step of selecting said second exposure value if the object area is detected, select said first exposure value if the object area is not detected, and if it is determined by said determination unit that there is a change in scene, and further if a predetermined time has elapsed since the object area was detected previously or since the no change in scene was detected previously, and select not to change the exposure value if the object area is not detected, and if it is determined by said determination unit that there is a change in scene, and further if the predetermined time has not elapsed since the object area was detected previously or since no change in scene was detected previously.

6. The image sensing apparatus according to claim 1, wherein the selection unit selects not to change the exposure value if, at a time of selecting the exposure value, the object area is not detected, and if it is determined by said determination unit that there is a change in scene, and further if the predetermined time has not elapsed since the object area was detected previously or since no change in scene was detected previously.

\* \* \* \* \*